United States Patent
Hwang et al.

(10) Patent No.: US 12,181,933 B2
(45) Date of Patent: Dec. 31, 2024

(54) DISPLAY DEVICE

(71) Applicant: LG ELECTRONICS INC., Seoul (KR)

(72) Inventors: Changkyu Hwang, Seoul (KR); Sungkwon Jang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 188 days.

(21) Appl. No.: 17/760,231

(22) PCT Filed: Feb. 3, 2021

(86) PCT No.: PCT/KR2021/001421
§ 371 (c)(1),
(2) Date: Aug. 5, 2022

(87) PCT Pub. No.: WO2021/158014
PCT Pub. Date: Aug. 12, 2021

(65) Prior Publication Data
US 2023/0073467 A1    Mar. 9, 2023

(30) Foreign Application Priority Data
Feb. 7, 2020 (KR) .......................... 10-2020-0015239

(51) Int. Cl.
*G06F 1/16* (2006.01)
(52) U.S. Cl.
CPC .......... *G06F 1/1681* (2013.01); *G06F 1/1652* (2013.01)

(58) Field of Classification Search
CPC ...... G06F 1/1652; G06F 1/1681; G09F 9/301; H04M 1/0268
See application file for complete search history.

(56) References Cited

U.S. PATENT DOCUMENTS

| | | | |
|---|---|---|---|
| 10,274,995 B2* | 4/2019 | Seo | G06F 1/1656 |
| 10,429,894 B2* | 10/2019 | Xia | G06F 1/1641 |
| 10,613,588 B2* | 4/2020 | Chang | H05K 5/0217 |
| 2007/0180745 A1* | 8/2007 | Ofuji | G03B 21/58 |
| | | | 40/601 |

(Continued)

FOREIGN PATENT DOCUMENTS

| KR | 1020170104837 | 9/2017 |
|---|---|---|
| KR | 1020180064492 | 6/2018 |

(Continued)

OTHER PUBLICATIONS

PCT International Application No. PCT/KR2021/001421, International Search Report dated Jun. 3, 2021, 2 pages.

*Primary Examiner* — Anthony Q Edwards
(74) *Attorney, Agent, or Firm* — LEE, HONG, DEGERMAN, KANG & WAIMEY

(57) ABSTRACT

Disclosed is a display device. The display device of the present disclosure includes: a flexible display panel; a module cover positioned behind of the display panel and coupled to the display panel in a rearward direction of the display panel, the module cover having a plurality of segments which respectively extend long in a left-right direction of the display panel, and which are sequentially arranged in an up-down direction of the display panel; and a hinge shaft which is disposed between the plurality of segments, and to which the plurality of segments are rotatably coupled.

14 Claims, 25 Drawing Sheets

(56) References Cited

U.S. PATENT DOCUMENTS

| | | | |
|---|---|---|---|
| 2010/0208417 A1 | 8/2010 | Visser et al. | |
| 2012/0002357 A1* | 1/2012 | Auld | G09F 11/30 |
| | | | 361/679.01 |
| 2016/0187929 A1* | 6/2016 | Kim | G06F 1/1643 |
| | | | 345/184 |
| 2016/0352878 A1* | 12/2016 | Kim | G06F 1/1626 |
| 2017/0318688 A1* | 11/2017 | Kim | H05K 5/0017 |
| 2017/0367198 A1* | 12/2017 | Park | H10K 50/84 |
| 2020/0178404 A1* | 6/2020 | Um | H10K 50/84 |
| 2023/0156939 A1* | 5/2023 | Wittenberg | G06F 1/1652 |
| | | | 361/807 |

FOREIGN PATENT DOCUMENTS

| | | |
|---|---|---|
| KR | 1020190012821 | 2/2019 |
| WO | 2020027367 | 2/2020 |

* cited by examiner

[FIG. 1]
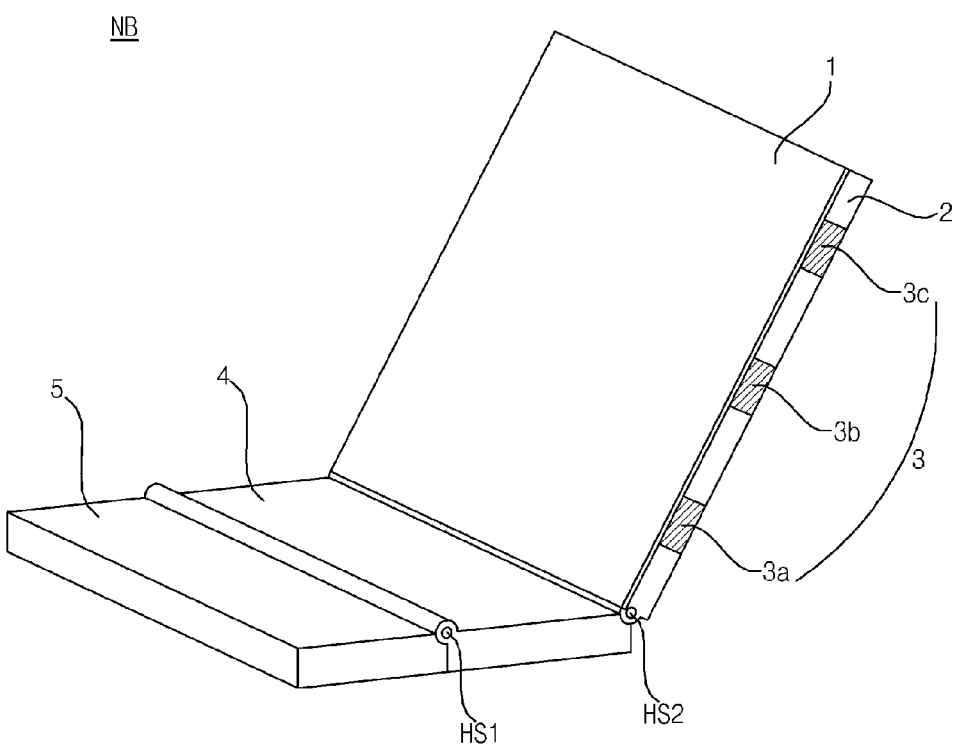

[FIG. 2]
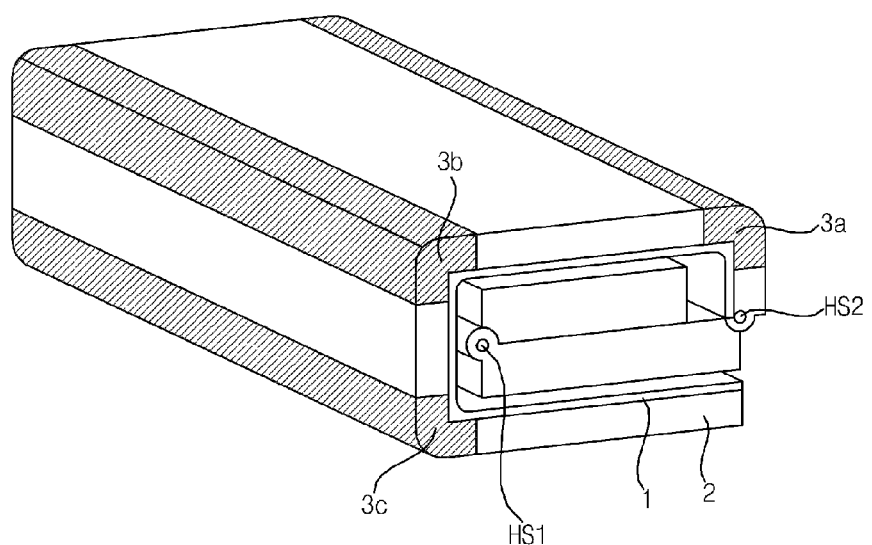

[FIG. 3]
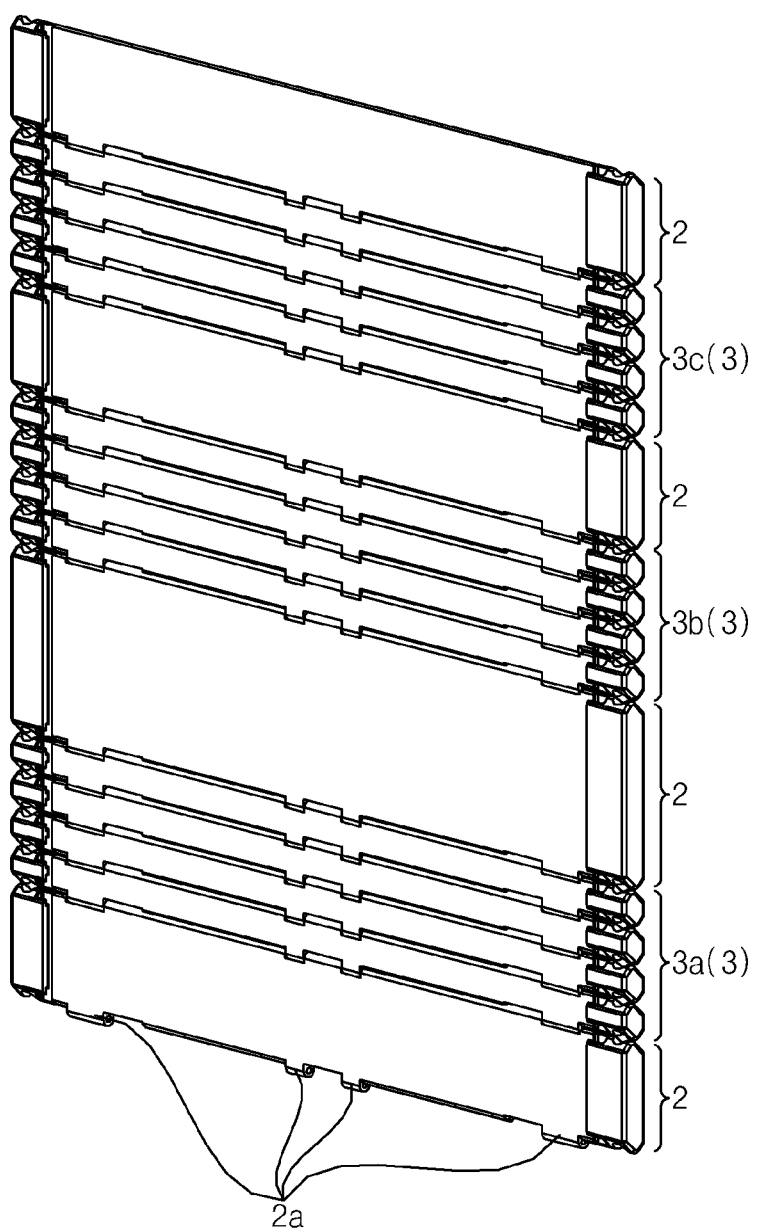

[FIG. 4]
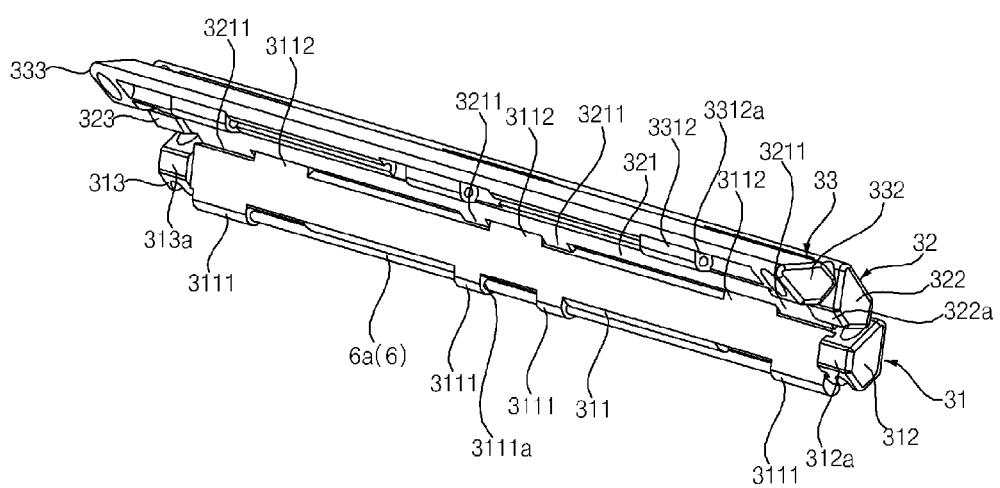

[FIG. 5]
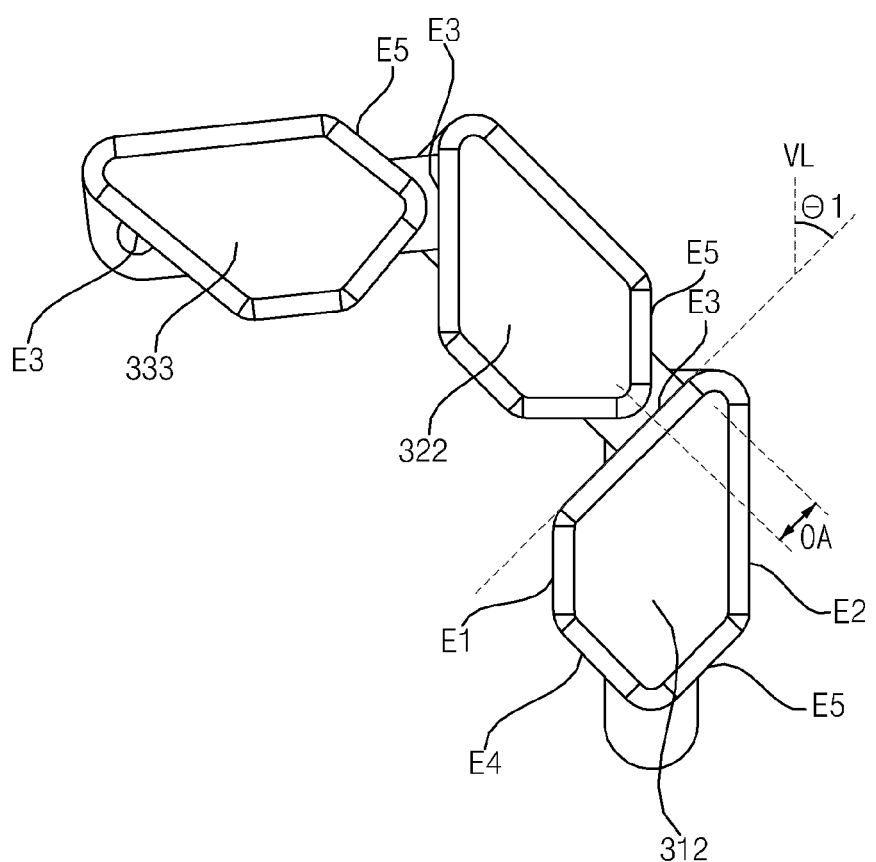

[FIG. 6]
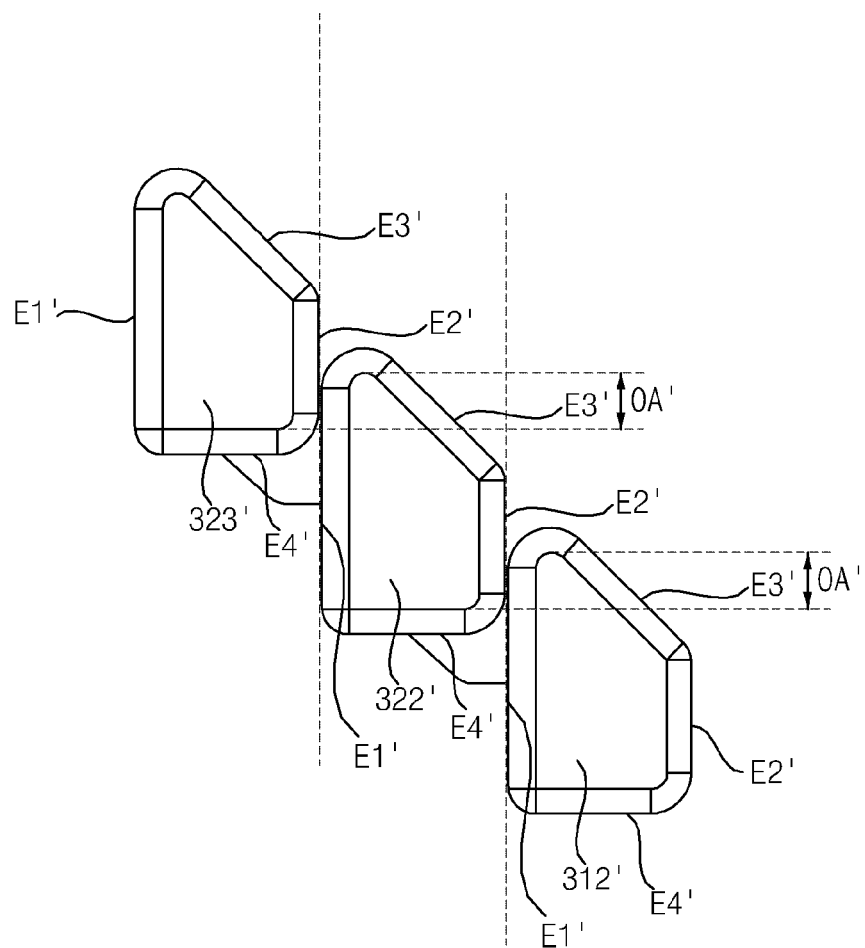

[FIG. 7]
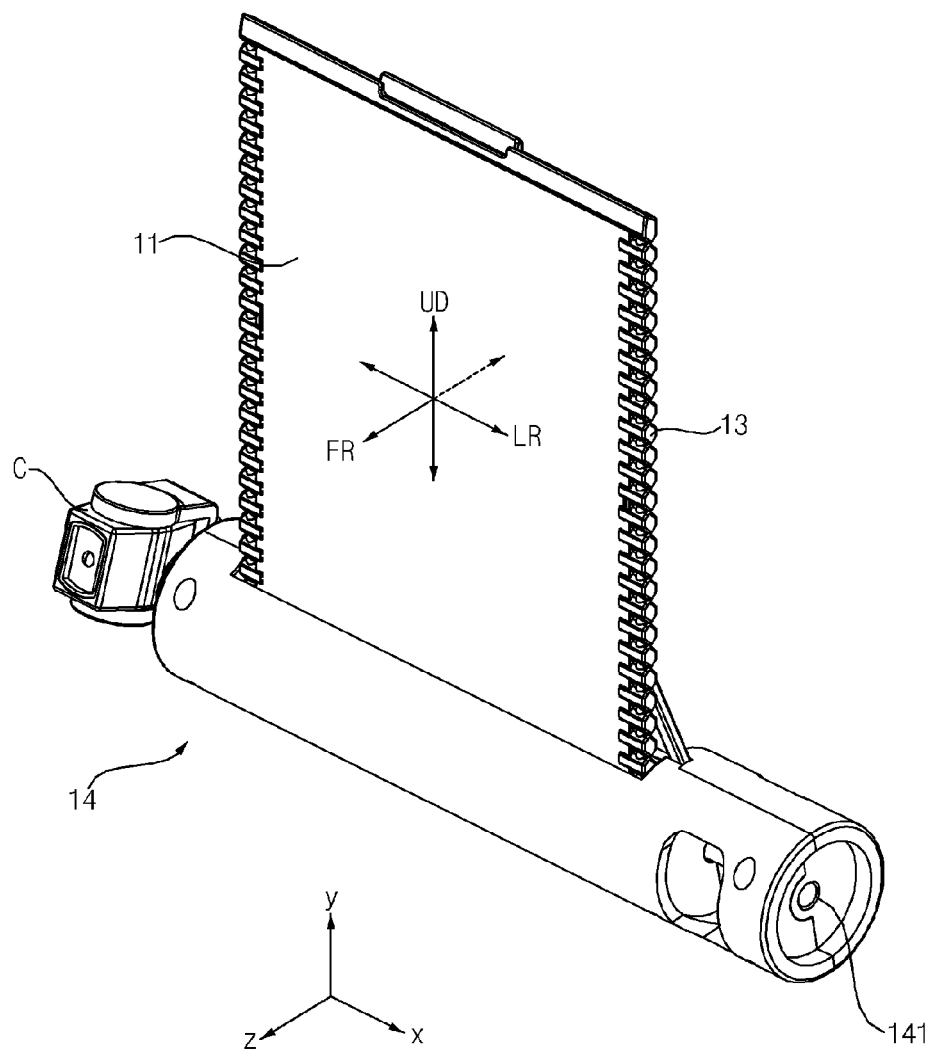

[FIG. 8]
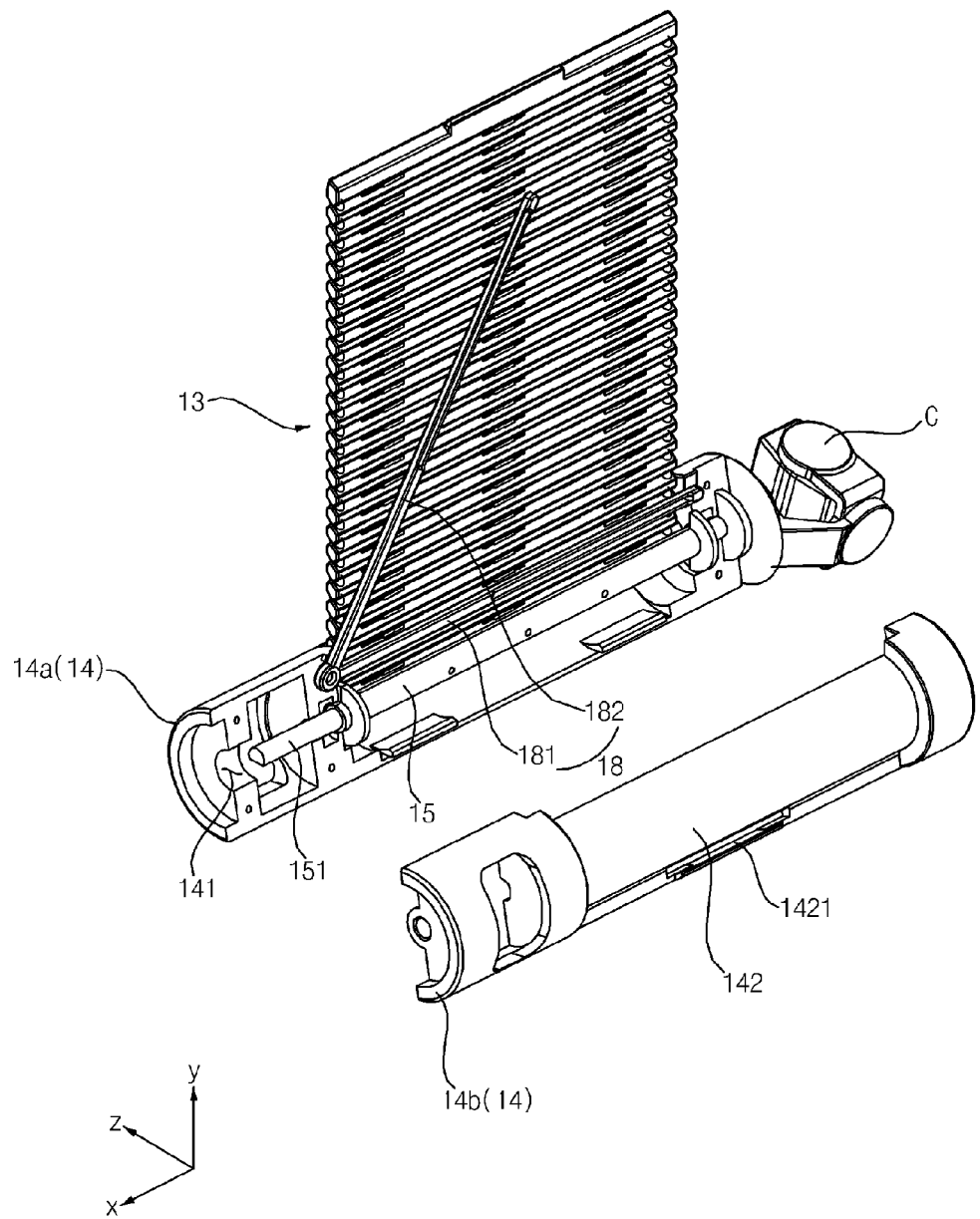

[FIG. 9]
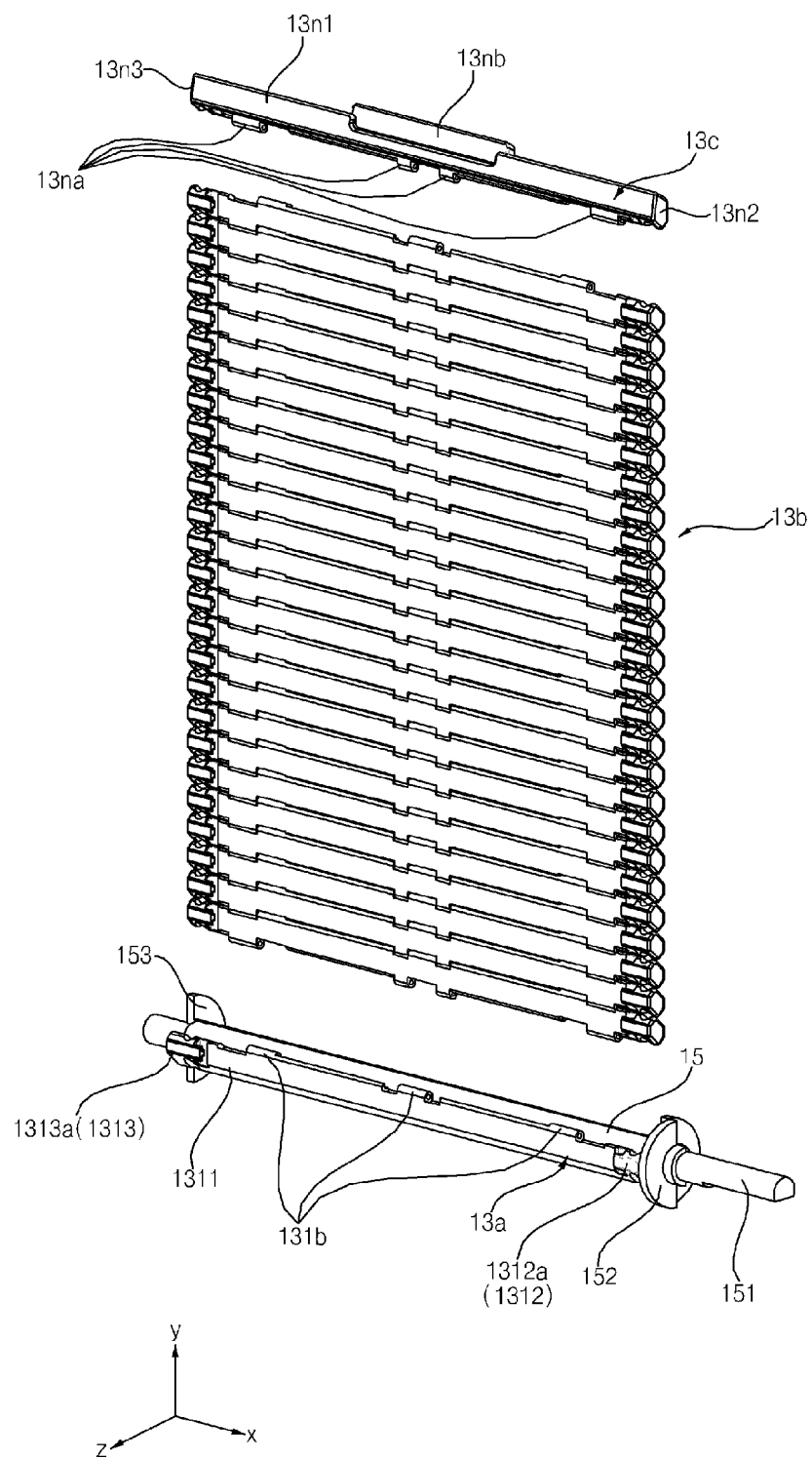

[FIG. 10]
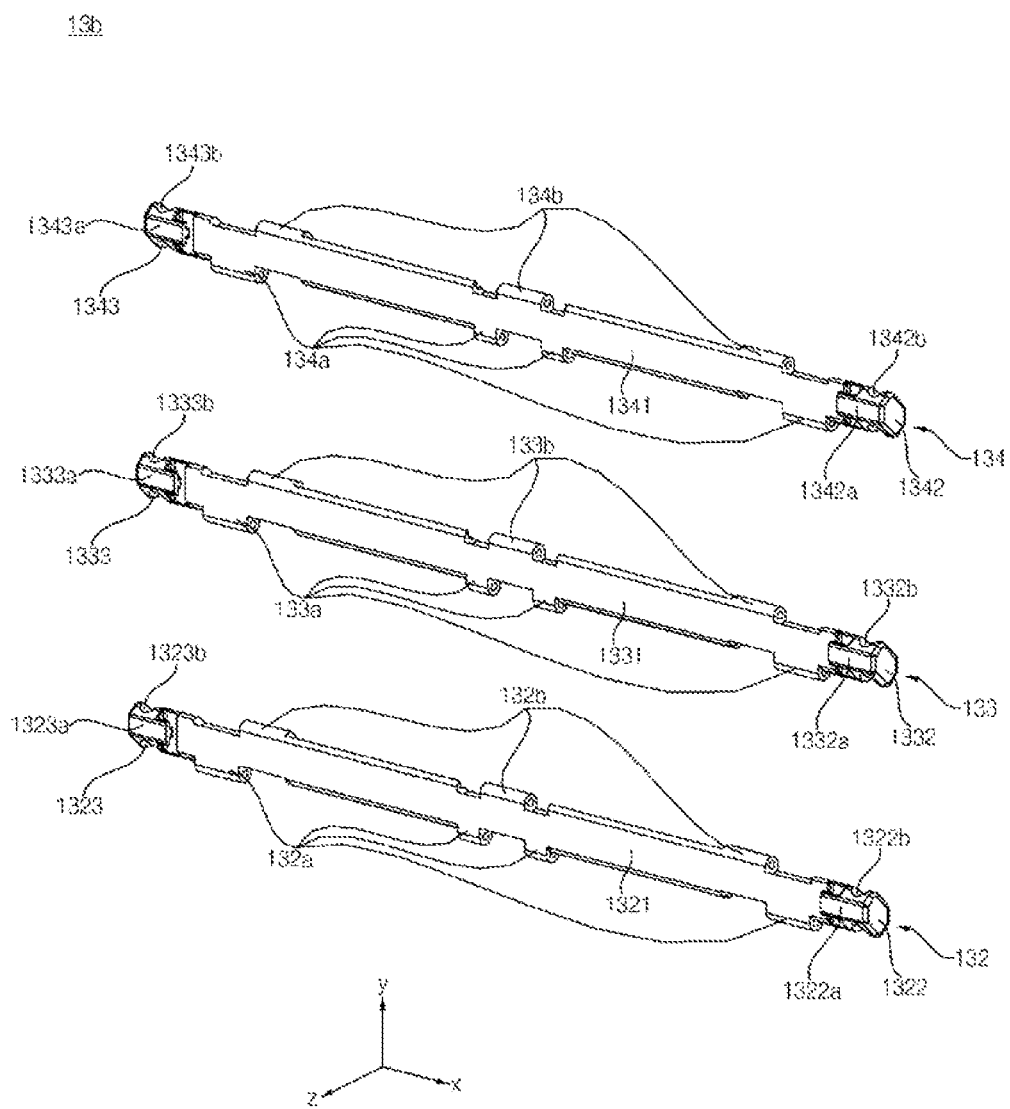

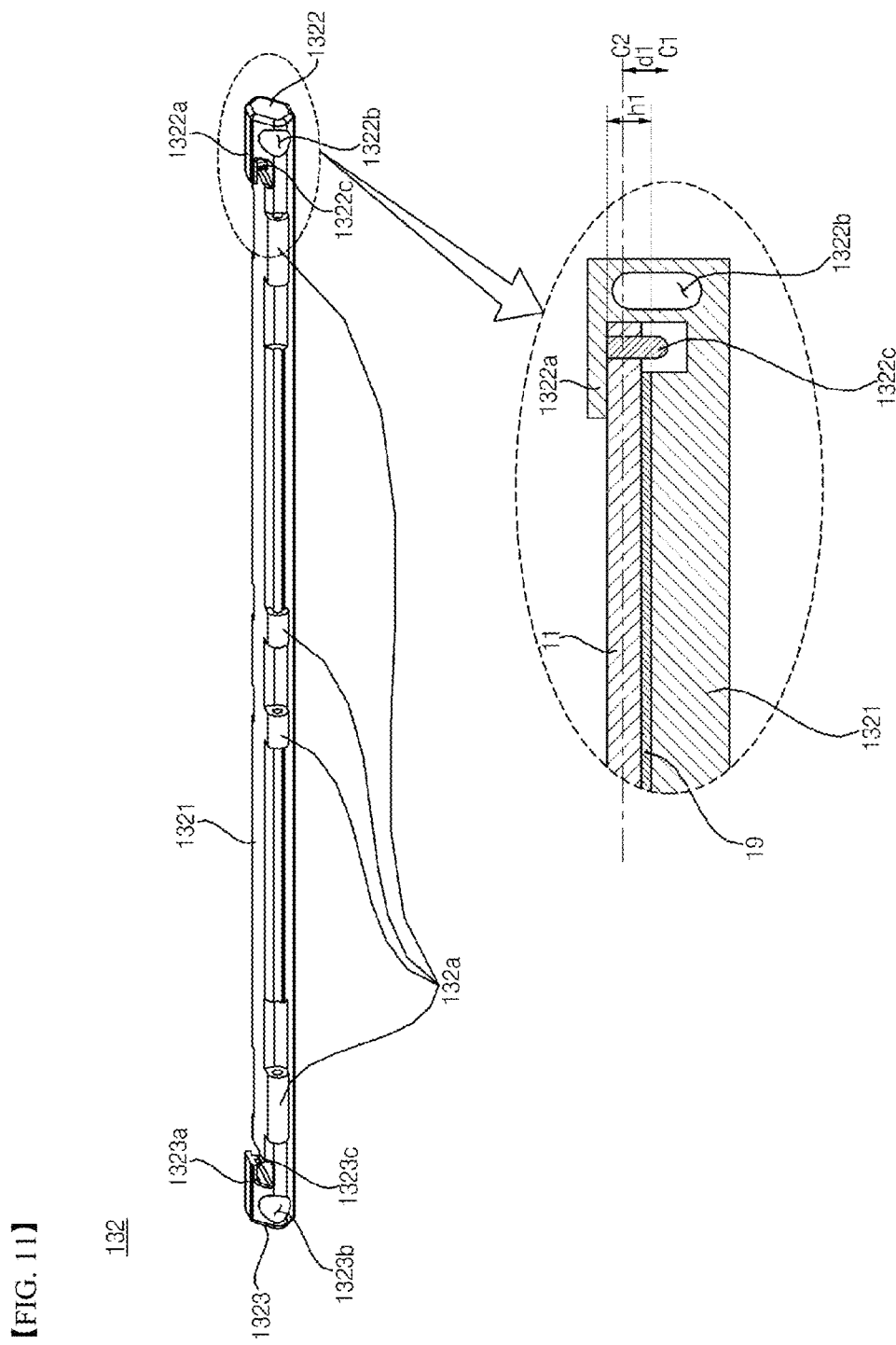
[FIG. 11]

[FIG. 12]
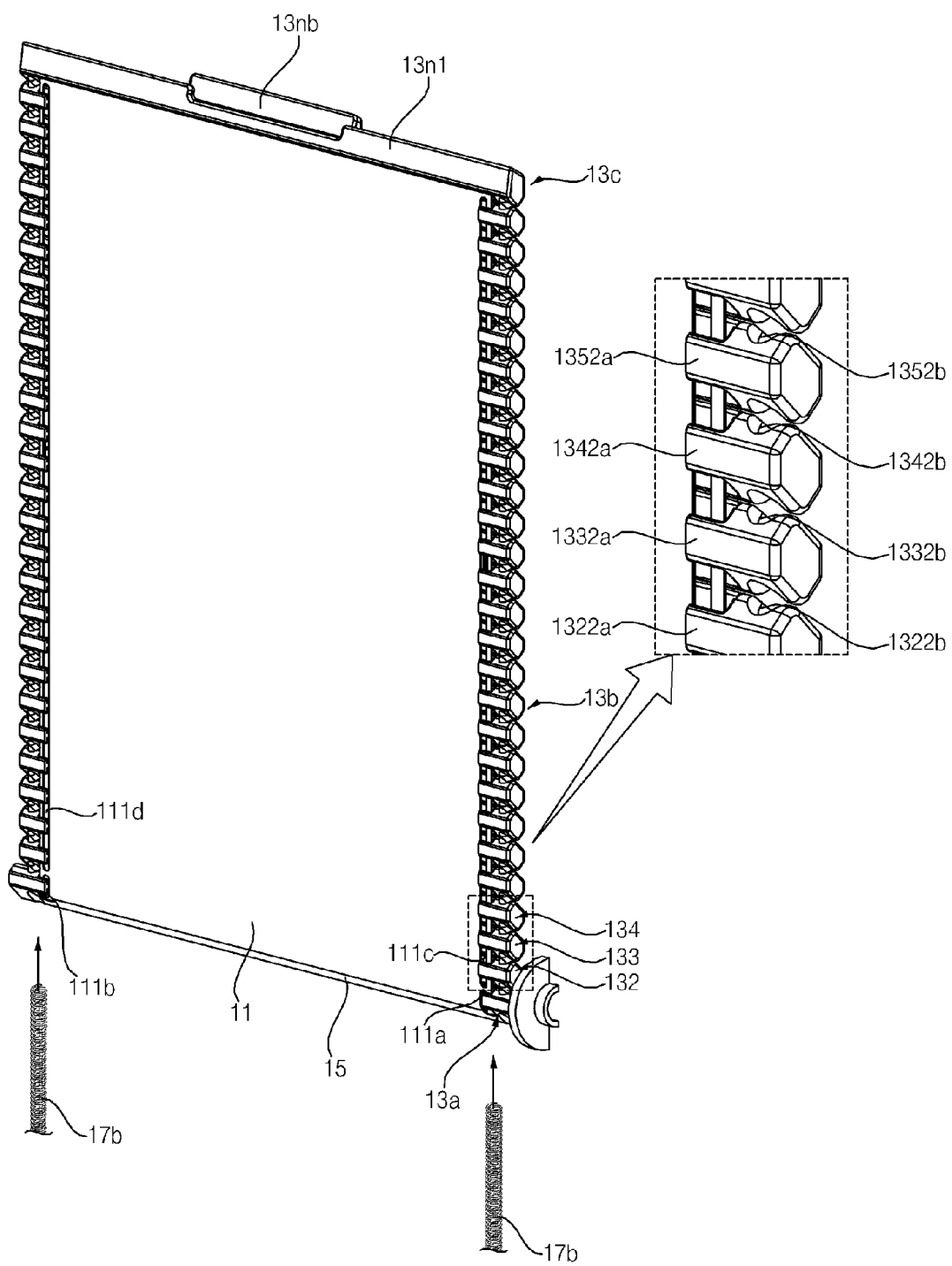

[FIG. 13]
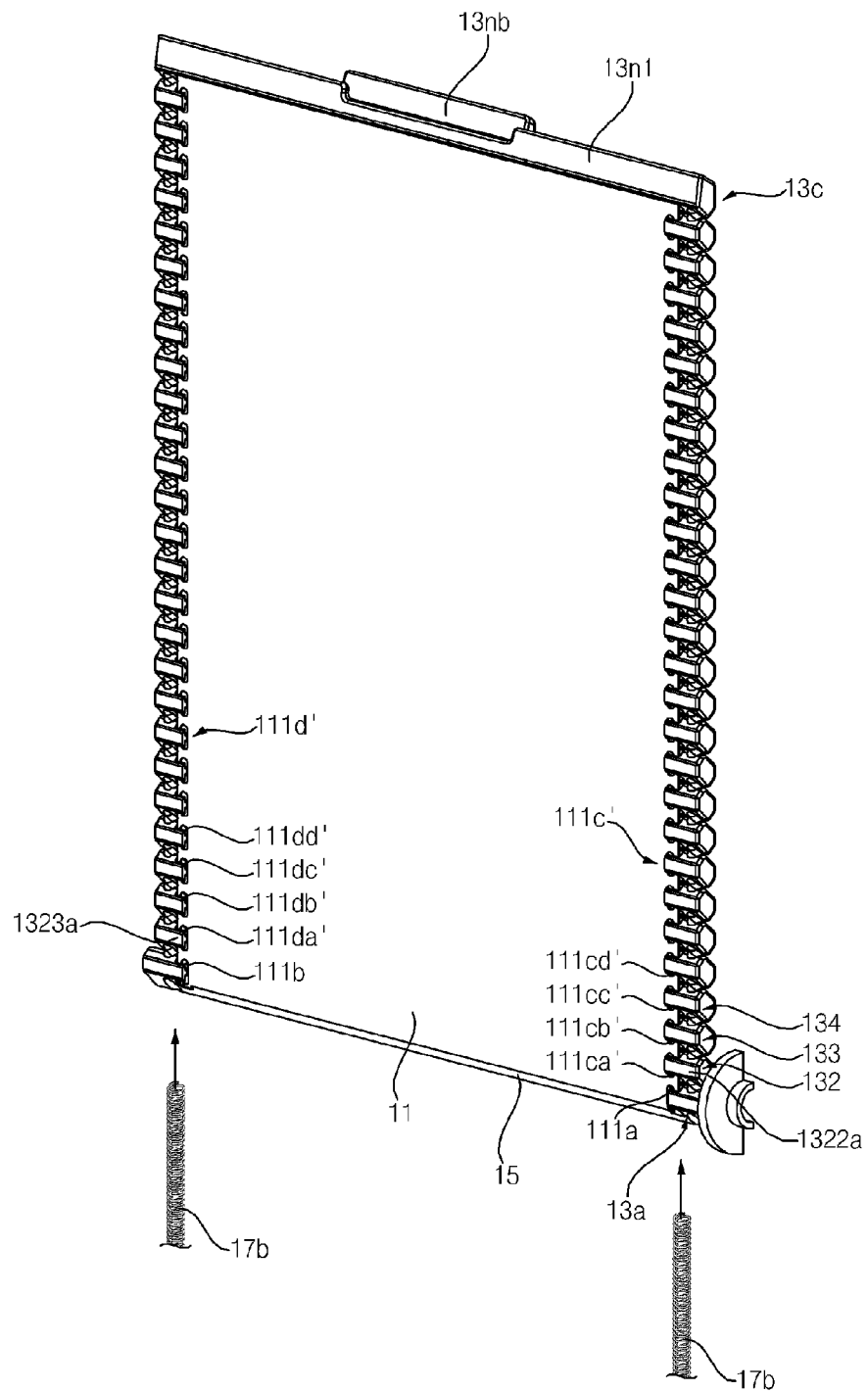

【FIG. 14】
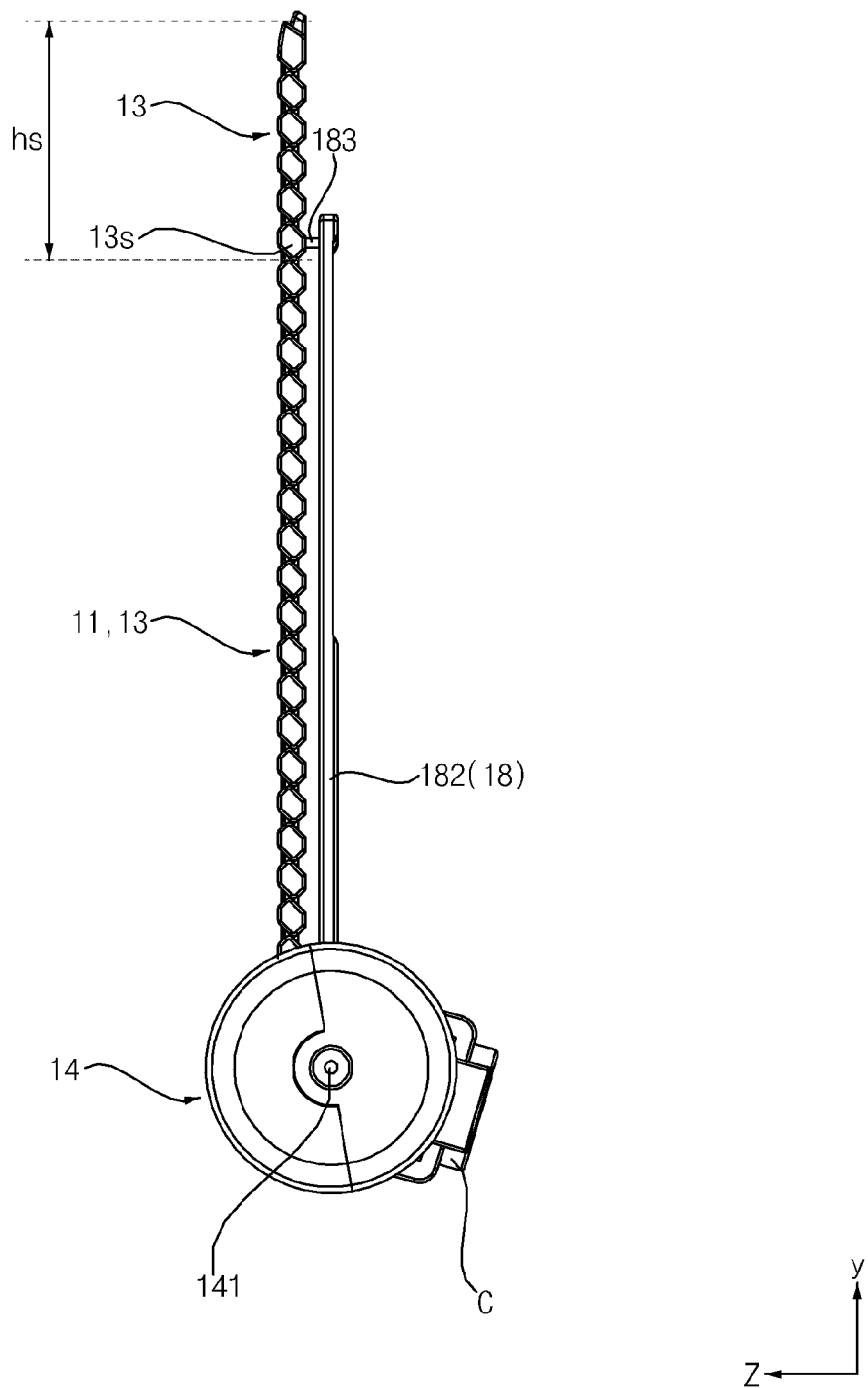

[FIG. 15]
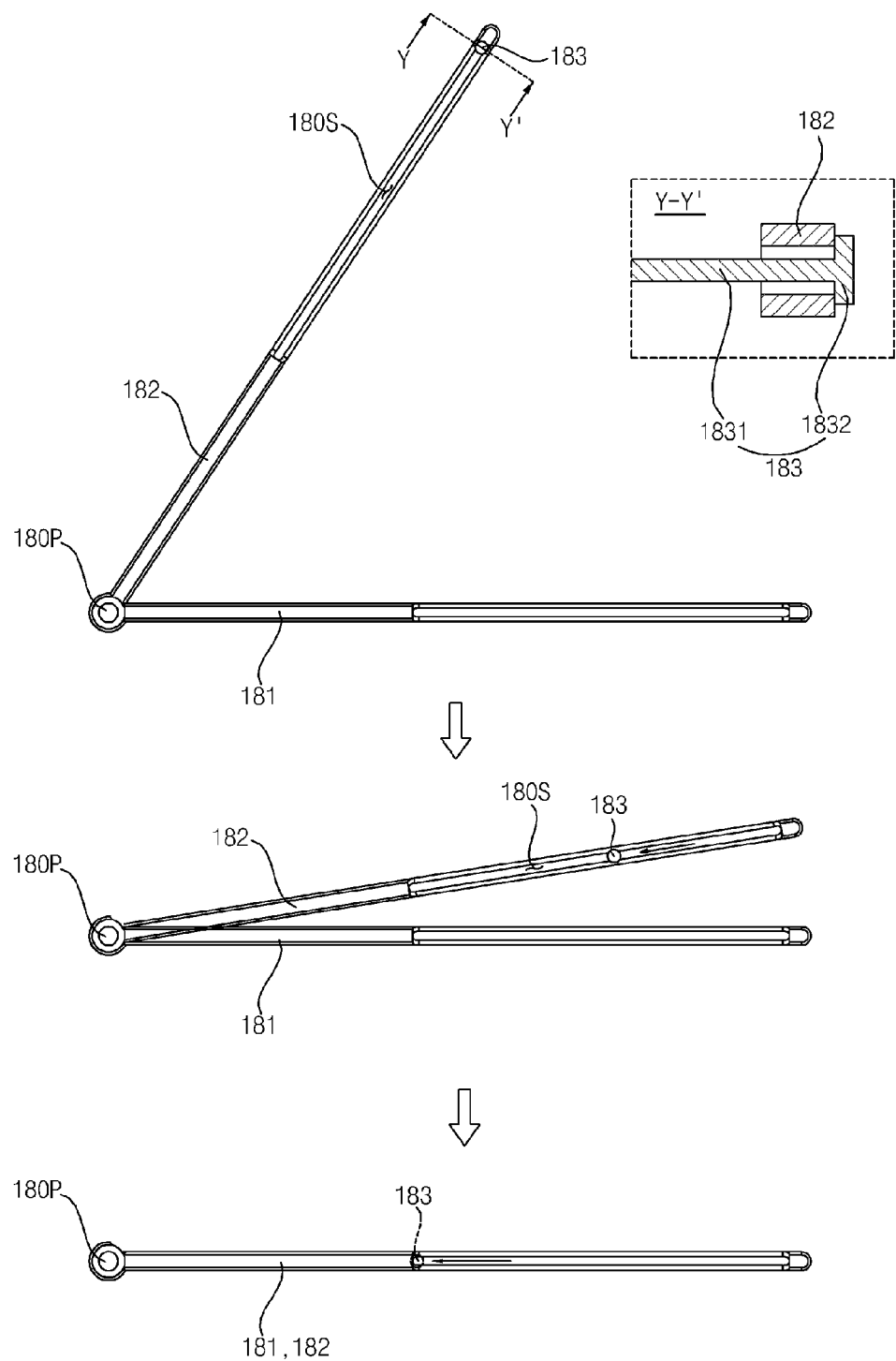

[FIG. 16]
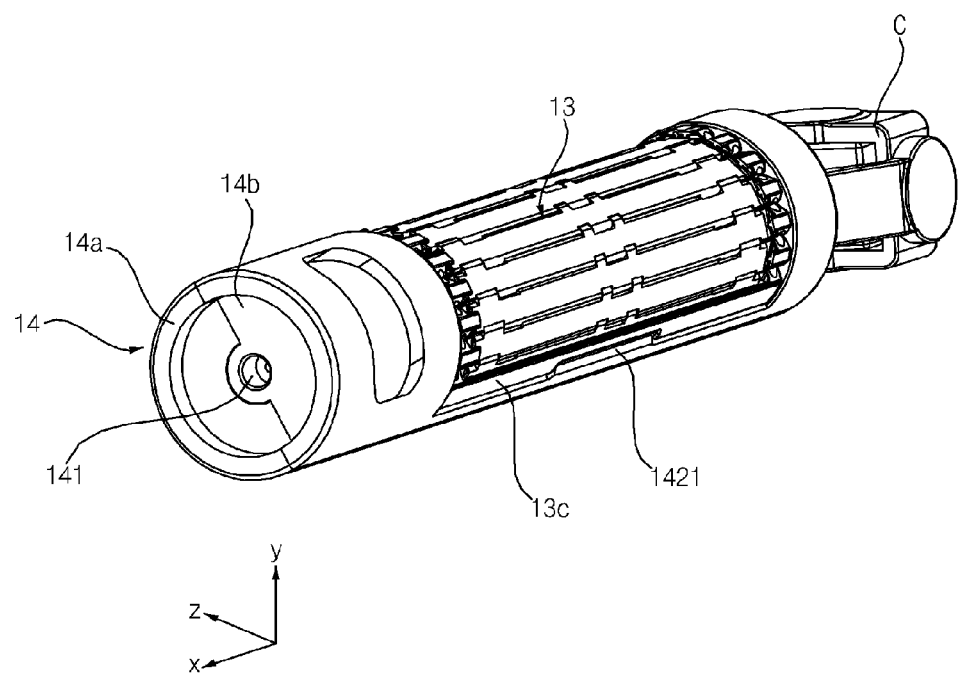

[FIG. 17]
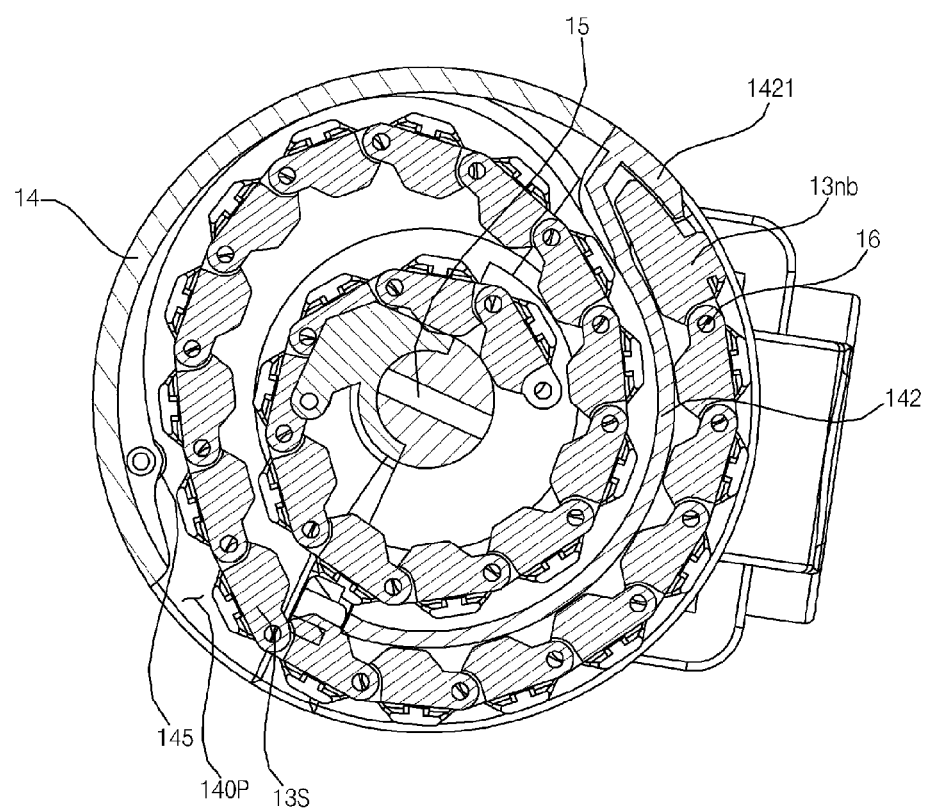

[FIG. 18]
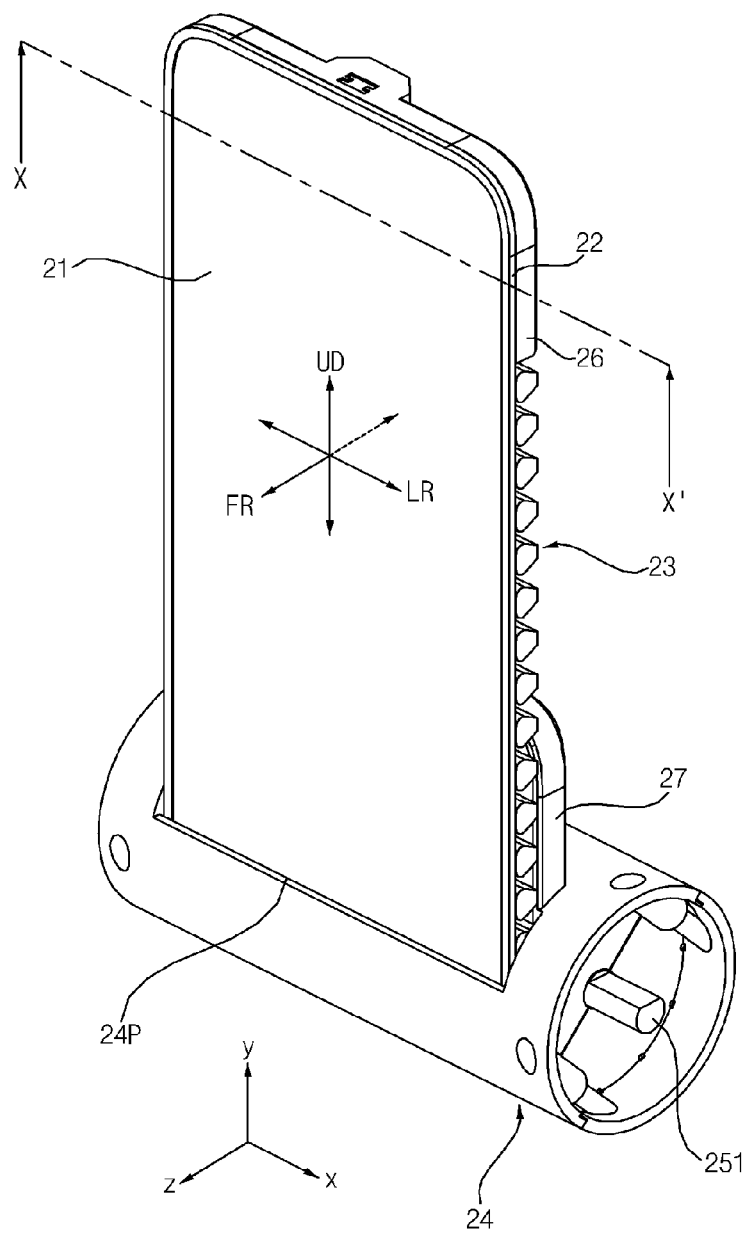

[FIG. 19]
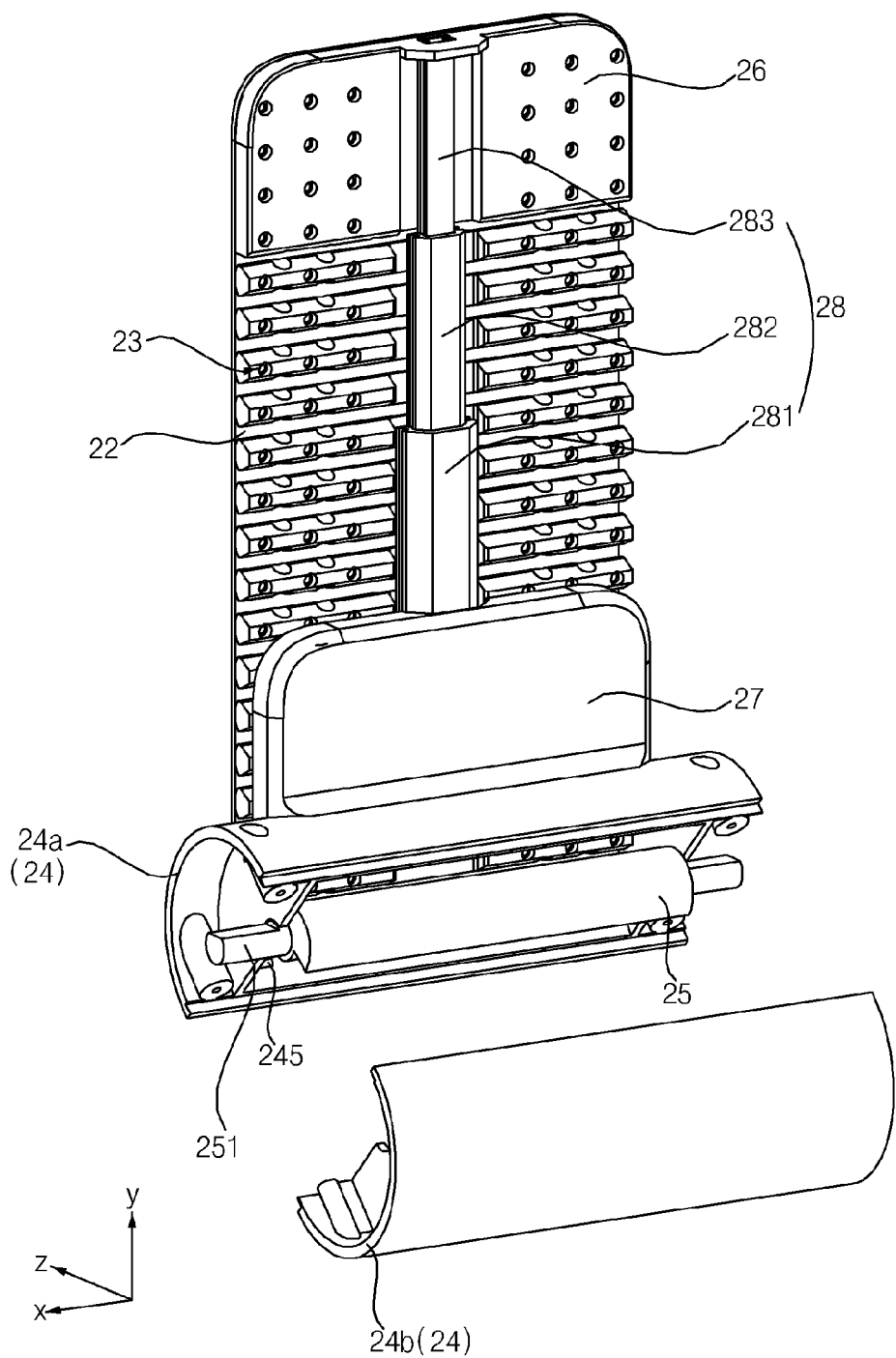

[FIG. 20]
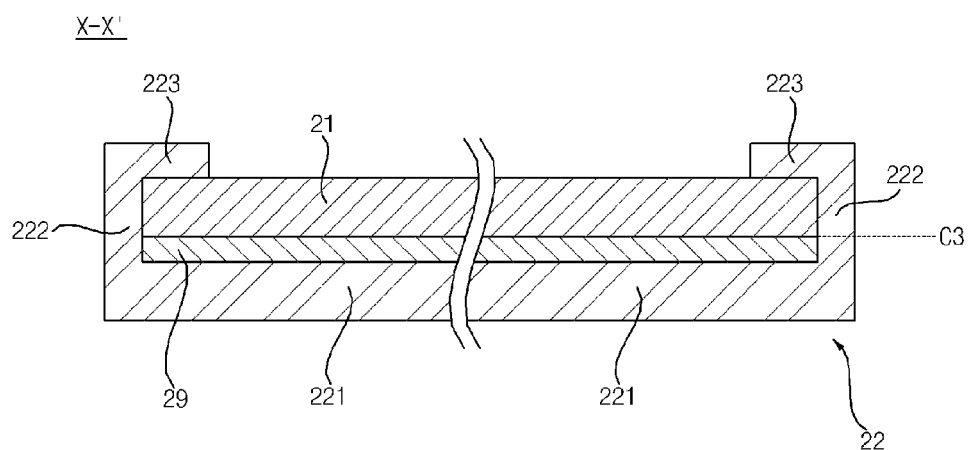

【FIG. 21】
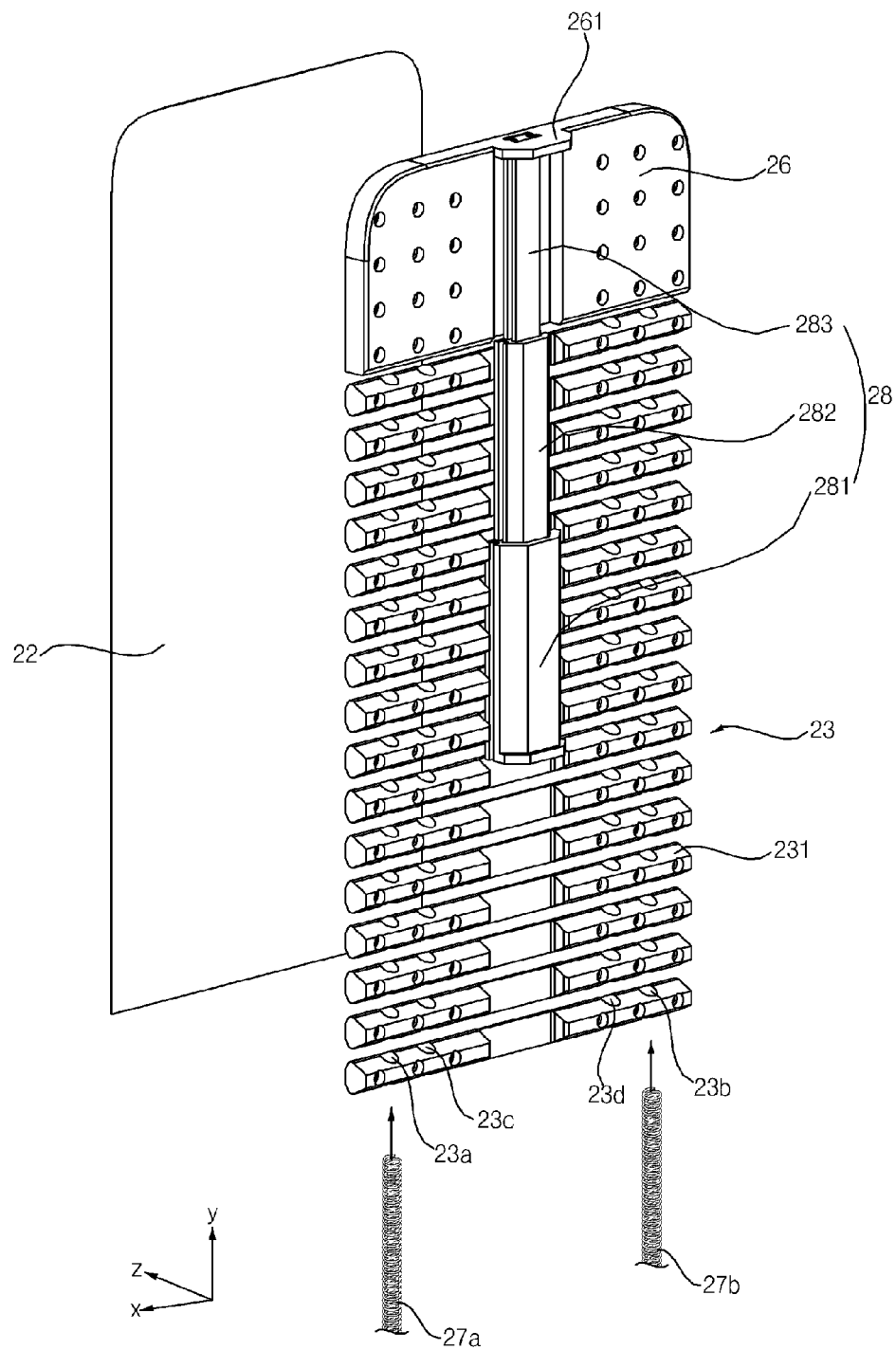

[FIG. 22]
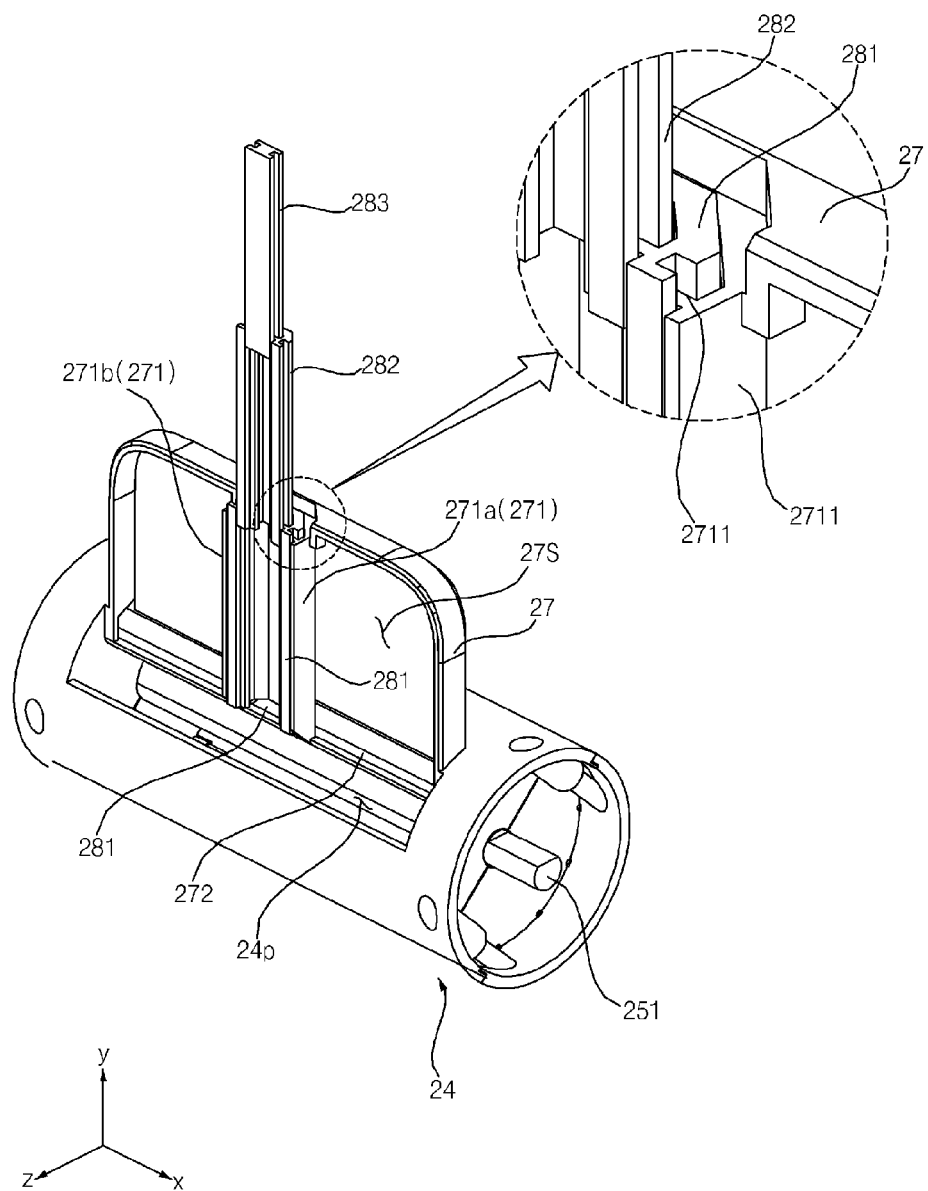

【FIG. 23】
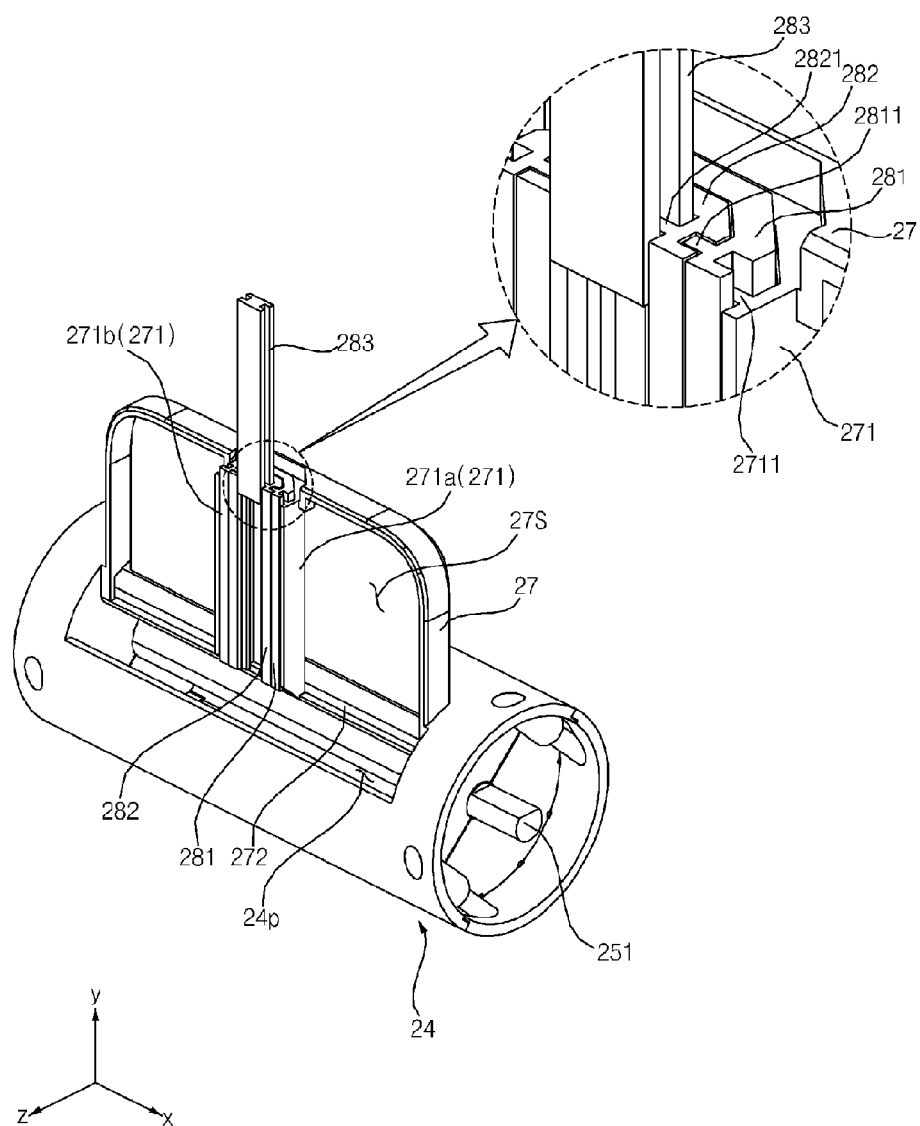

[FIG. 24]
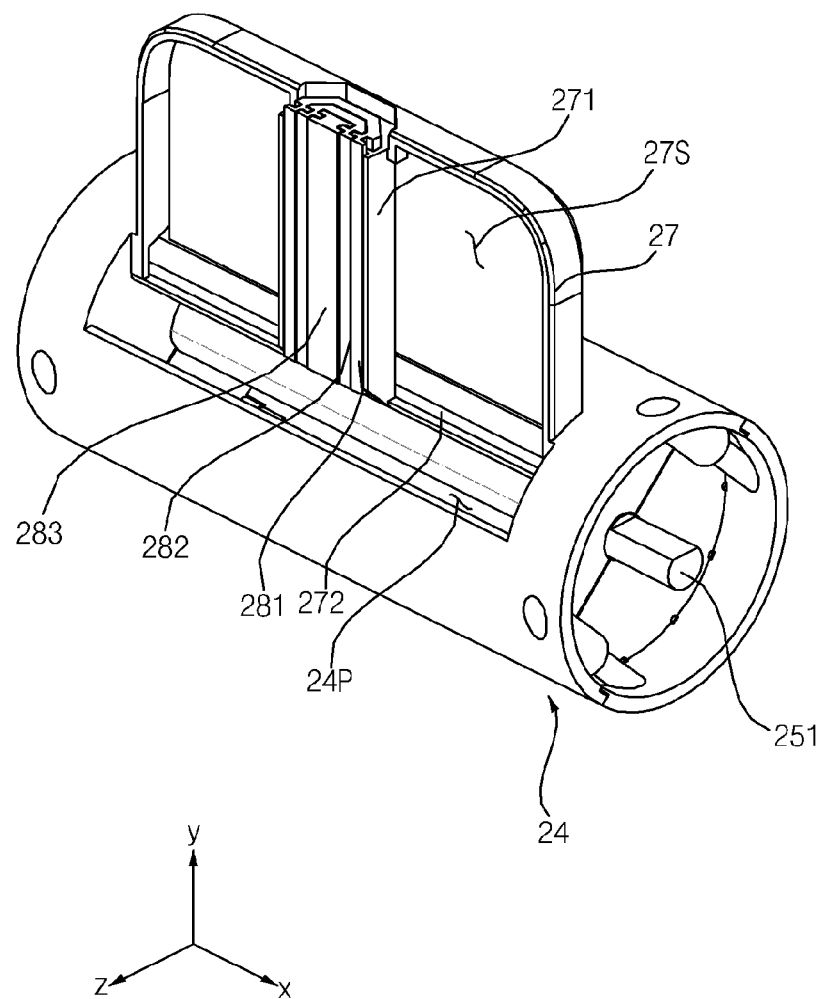

【FIG. 25】
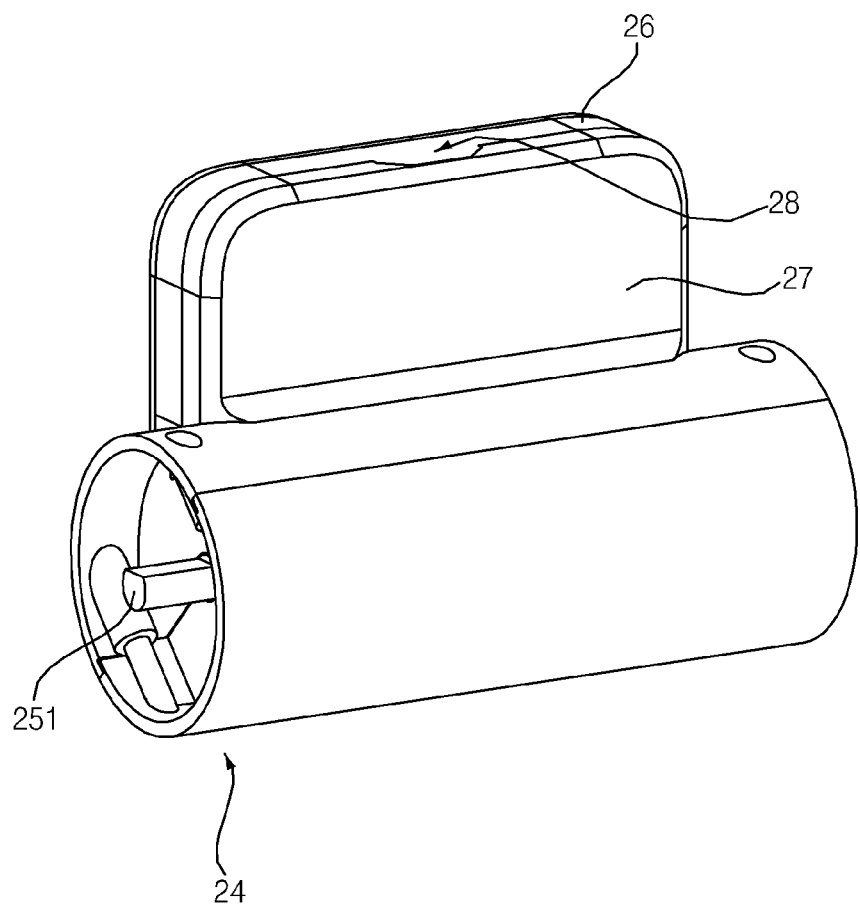

DISPLAY DEVICE

CROSS-REFERENCE TO RELATED APPLICATION(S)

This application is the National Stage filing under 35 U.S.C. 371 of International Application No. PCT/KR2021/001421, filed on Feb. 3, 2021, which claims the benefit of earlier filing date and right of priority to Korean Application No. 10-2020-0015239 filed on Feb. 7, 2020, the contents of which are all incorporated by reference herein in their entirety.

TECHNICAL FIELD

The present disclosure relates to a display device.

BACKGROUND ART

As the information society develops, the demand for display devices is also increasing in various forms. In response to this, various display devices such as Liquid Crystal Display Device (LCD), Plasma Display Panel (PDP), Electroluminescent Display (ELD), Vacuum Fluorescent Display (VFD), and Organic Light Emitting Diode (OLED) have been researched and used in recent years.

Among them, a LCD panel includes a TFT substrate and a color substrate that face each other with a liquid crystal layer interposed therebetween, and may display an image using light provided from a backlight unit. In addition, an OLED panel may display an image by depositing an organic material layer that can emit a light by itself on a substrate on which a transparent electrode is formed. In particular, a display device including an OLED panel has an advantage of being implemented in an ultra-thin shape as it does not require a backlight unit.

In addition, a flexible display panel can be bent or wound on a roller. By using the flexible display panel, it is possible to implement a display device that is roll out from a roller or wound on a roller. A lot of research has been done on a structure for winding or unwinding a flexible display panel on/from a roller.

DISCLOSURE

Technical Problem

An object of the present disclosure may be to solve the above and other problems.

Another object of the present disclosure may be to provide a display device having a module cover that can be bent or unfolded together with a display panel while supporting the standing of a flexible display panel.

Another object of the present disclosure may be to provide a structure of a segment of module cover that can restrict the bending direction of the module cover.

Another object of the present disclosure may be to provide a structure that can improve a support force of module cover with respect to the standing of a display panel.

Another object of the present disclosure may be to provide a display device in which a display panel and a module cover supporting the same can be smoothly wound around or unwound from a roller.

Technical Solution

According to an aspect of the present disclosure for achieving the above object, there is provided a display device including: a flexible display panel; a module cover positioned behind of the display panel and coupled to the display panel, the module cover having a plurality of segments which respectively extend long in a left-right direction of the display panel, and which are sequentially arranged in an up-down direction of the display panel; and a hinge shaft which is disposed between the plurality of segments, and to which the plurality of segments are rotatably coupled.

Advantageous Effects

The effect of the display device according to the present disclosure will be described as follows.

According to at least one of embodiments of the present disclosure, it is possible to provide a display device having a module cover that can be bent or unfolded together with a display panel while supporting the standing of a flexible display panel.

According to at least one of embodiments of the present disclosure, it is possible to provide a structure of a segment of module cover that can restrict the bending direction of the module cover.

According to at least one of embodiments of the present disclosure, it is possible to provide a structure that can improve a support force of module cover with respect to the standing of a display panel.

According to at least one of embodiments of the present disclosure, it is possible to provide a display device in which a display panel and a module cover supporting the same can be smoothly wound around or unwound from a roller.

Further scope of applicability of the present disclosure will become apparent from the following detailed description. However, it should be understood that the detailed description and specific embodiments such as preferred embodiments of the present disclosure are given by way of example only, since various changes and modifications within the spirit and scope of the present disclosure may be clearly understood by those skilled in the art.

DESCRIPTION OF DRAWINGS

FIGS. 1 to 25 are diagrams illustrating examples of a display device according to embodiments of the present disclosure.

MODE FOR DISCLOSURE

Description will now be given in detail according to exemplary embodiments disclosed herein, with reference to the accompanying drawings. For the sake of brief description with reference to the drawings, the same or equivalent components may be denoted by the same reference numbers, and description thereof will not be repeated.

In general, suffixes such as "module" and "unit" may be used to refer to elements or components. Use of such suffixes herein is merely intended to facilitate description of the specification, and the suffixes do not have any special meaning or function.

In the present disclosure, that which is well known to one of ordinary skill in the relevant art has generally been omitted for the sake of brevity. The accompanying drawings are used to assist in easy understanding of various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are only used to distinguish one element from another.

It will be understood that when an element is referred to as being "connected with" another element, there may be intervening elements present. In contrast, it will be understood that when an element is referred to as being "directly connected with" another element, there are no intervening elements present.

A singular representation may include a plural representation unless context clearly indicates otherwise.

In the present application, it should be understood that the terms "comprises, includes," "has," etc. specify the presence of features, numbers, steps, operations, elements, components, or combinations thereof described in the specification, but do not preclude the presence or addition of one or more other features, numbers, steps, operations, elements, components, or combinations thereof.

Referring to FIG. 1, a display device NB may include a display panel 1, a base 2, a module cover 3, a first frame 4, and a second frame 5. A main board or a printed circuit board (PCB) may be embedded in the first frame 4. A keyboard and/or a trackpad may be installed in the first frame 4. A power source such as a rechargeable battery may be built into the second frame 5. The power source may provide power to the display panel 1, a main board, a keyboard, a trackpad, and the like. Meanwhile, the display device NB may be a notebook computer.

The display panel 1 may be a flexible display panel. For example, the display panel 1 may be an organic light emitting diode (OLED) panel or a plastic OLED (POLED) panel. Accordingly, the display panel 1 may be bent.

The base 2 and the module cover 3 may be coupled to the display panel 1 in the rearward direction of the display panel 1. For example, the base 2 and the module cover 3 may be coupled to the rear surface of the display panel 1 through an adhesive member such as a double-sided tape. The base 2 and the module cover 3 may be alternately disposed in the rearward direction of the display panel 1. For example, the base 2 may be a plate, and may maintain a flat state. For example, the module cover 3 may have a plurality of segments, and may be bent or unfolded.

Referring to FIGS. 1 and 2, the first frame 4 and the second frame 5 may be hinged. A first shaft HS1 may be coupled to the first frame 4 and the second frame 5 at between the first frame 4 and the second frame 5. In this case, a user may rotate the first frame 4 and the second frame 5 about the first shaft HS1.

For example, in a first posture, the second frame 5 may be disposed in parallel to the first frame 4 in a forward direction of the first frame 4 (see FIG. 1). For example, in a second posture, the second frame 5 may be folded upwards of the first frame 4 (see FIG. 2).

The first frame 4 and the base 2 may be hinged. The second shaft HS2 may be coupled to the first frame 4 and the base 2 at between the first frame 4 and the base 2. In this case, a user may rotate the first frame 4 and the base 2 about a second shaft HS2.

For example, in the first posture, the display panel 1, the base 2, and the module cover 3 may maintain a flat state. In this case, an angle between the display panel 1 and the first frame 4 may be 0 to 360 degrees. For example, in the second posture, the display panel 1, the base 2, and the module cover 3 may be wound around at least a portion of the first frame 4 and/or the second frame 5. At this time, the base 2 may be maintained in a flat state, but the module cover 3a, 3b, 3c may be bent.

Referring to FIGS. 1 and 3, the front surfaces of the base 2 and the module cover 3 may face the rear surface of the display panel 1, and may be formed to be flat.

A base holder 21 may be formed in one end or a lower end of the base 2. The second shaft HS2 may be inserted into a shaft hole (not shown) of a frame holder formed in one end or a rear end of the first frame 4 and a shaft hole (no reference numeral) of the base holder 21. That is, the center of the second shaft HS2 may be aligned with the center of the shaft hole of the base holder 21 and the center of the shaft hole of the frame holder.

The base 2 and the module cover 3 may extend long in the left-right direction. The base 2 and the module cover 3 may be alternately disposed in an up-down direction which is a direction intersecting with a length direction of the base 2 and the module cover 3. For example, the module cover 3 may include a first module cover 3a, a second module cover 3b, and a third module cover 3c. The first module cover 3a may be adjacent to the lower side of the base 2, the third module cover 3c may be adjacent to the upper side of the base 2, and the second module cover 3b may be disposed between the first module cover 3a and the third module cover 3c.

The first module cover 3a, the second module cover 3b, and the third module cover 3c may have the same shape. Each of the first module cover 3a, the second module cover 3b, and the third module cover 3c may include a plurality of segments (no reference numeral), which will be described later in more detail.

Referring to FIGS. 2 and 4, the module cover 3 may include a plurality of segments 31, 32, 33. The plurality of segments 31, 32, 33 may be hinged to each other. Among the plurality of segments 31, 32, 33, the segment located in one side of the module cover 3 may be hinged to the adjacent base 2, and the segment located in the other side of the module cover 3 may be hinged to the adjacent base 2.

For example, the plurality of segments 31, 32, and 33 may include a first segment 31, a second segment 32, and a third segment 33. The first segment 31, the second segment 32, and the third segment 33 may be sequentially disposed in a direction intersecting with the length direction of the module cover 3.

The first segment 31 may include a first body 311, a first left cover 312, and a first right cover 313. The first body 311 may extend long in the left-right direction of the display panel 1, and may have a flat front surface. The first left cover 312 may be provided in the left side of the first body 311, and the first right cover 313 may be provided in the right side of the first body 311. The first left cover 312 may cover the left surface of the display panel 1, and the first right cover 313 may cover the right surface of the display panel 1.

A first lower holder 3111 may be formed in the lower end of the first body 311, and a first lower shaft hole 3111a may be formed by penetrating the first lower holder 3111 in the left-right direction. For example, the first lower holder 3111 may include a plurality of first lower holders spaced apart from each other in the left-right direction. A first upper holder 3112 may be formed in the upper end of the first body 311, and a first upper shaft hole 3112a may be formed by penetrating the first upper holder 3112 in the left-right direction. For example, the first upper holder 3112 may include a plurality of first upper holders spaced apart from each other in the left-right direction.

The second segment 32 may include a second body 321, a second left cover 322, and a second right cover 323. The second body 321 may extend long in the left-right direction of the display panel 1, and may have a flat front surface. The second left cover 322 may be provided in the left side of the second body 321, and the second right cover 323 may be provided in the right side of the second body 321. The second left cover 322 may cover the left surface of the display panel 1, and the second right cover 323 may cover the right surface of the display panel 1.

A second lower holder 3211 may be formed in the lower end of the second body 321, and a second lower shaft hole 3211a may be formed by penetrating the second lower holder 3211 in the left-right direction. For example, the second lower holder 3211 may include a plurality of second lower holders spaced apart from each other in the left-right direction. A second upper holder 3212 may be formed in an upper end of the second body 321, and a second upper shaft hole 3212a may be formed by penetrating the second upper holder 3212 in the left-right direction. For example, the second upper holder 3212 may include a plurality of second upper holders spaced apart from each other in the left-right direction.

The third segment 33 may include a third body 331, a third left cover 332, and a third right cover 333. The third body 331 may extend long in the left-right direction of the display panel 1, and may have a flat front surface. The third left cover 332 may be provided in the left side of the third body 331, and the third right cover 333 may be provided in the right side of the third body 331. The third left cover 332 may cover the left surface of the display panel 1, and the third right cover 333 may cover the right surface of the display panel 1.

A third lower holder 3311 may be formed in the lower end of the third body 331, and a third lower shaft hole 3311a may be formed by penetrating the third lower holder 3311 in the left-right direction. For example, the third lower holder 3311 may include a plurality of third lower holders spaced apart from each other in the left-right direction. A third upper holder 3312 may be formed in the upper end of the third body 331, and a third upper shaft hole 3312a may be formed by penetrating the third upper holder 3312 in the left-right direction. For example, the third upper holder 3312 may include a plurality of third upper holders spaced apart from each other in the left-right direction.

The first lower holder 3111 may be hinged to the base 2 adjacent to the first lower holder 3111. A first hinge shaft 6a may extend long in the left-right direction, and may be inserted into the first lower shaft hole 3111a and the shaft hole of the base 2 parallel to the first lower shaft hole 3111a. That is, the center of the first hinge shaft 6a may be aligned with the center of the first lower shaft hole 3111a and the center of the shaft hole of the base 2. Thus, the first segment 31 may be rotated about the first hinge shaft 6a with respect to the base 2.

The second lower holder 3211 may be hinged to the first upper holder 3112 adjacent to the second lower holder 3211. The second hinge shaft 6b may extend long in the left-right direction, and may be inserted into the first upper shaft hole 3112a and the second lower shaft hole 3211a. That is, the center of the second hinge shaft 6b may be aligned with the center of the first upper shaft hole 3112a and the center of the second lower shaft hole 3211a. Accordingly, the second segment 32 may be rotated about the second hinge shaft 6b with respect to the first segment 31.

The third lower holder 3311 may be hinged to the second upper holder 3212 adjacent to the third lower holder 3311.

The third hinge shaft 6c may extend long in the left-right direction, and may be inserted into the second upper shaft hole 3212a and the third lower shaft hole 3311a. That is, the center of the third hinge shaft 6c may be aligned with the center of the second upper shaft hole 3212a and the center of the third lower shaft hole 3311a. Thus, the third segment 33 may be rotated about the third hinge shaft 6c with respect to the second segment 32.

The third upper holder 3312 may be hinged to the base 2 adjacent to the third upper holder 3312. A fourth hinge shaft 6d may extend long in the left-right direction, and may be inserted into the shaft hole of the base 2 parallel to the third upper shaft hole 3312a and the second upper shaft hole 3312a. That is, the center of the fourth hinge shaft 6d may be aligned with the center of the third upper shaft hole 3312a and the center of the shaft hole of the base 2. Thus, the base 2 may be rotated about the fourth hinge shaft 6d with respect to the third segment 3.

Accordingly, the module cover 3 may be bent or unfolded. In addition, the base 2 may be rotated with respect to the module cover 3.

Meanwhile, each of a first left guide 312a, a second left guide 322a, and a third left guide 332a may protrude to the right from each of the first left cover 312, the second left cover 322, and the third left cover 332, and may be spaced apart in the forward direction from the front surface of each of the first body 311, the second body 321, and the third body 331. Each of a first right guide 313a, a second right guide 323a, and a third right guide 333a may protrude to the left from each of the first right cover 313, the second right cover 323, and the third right cover 333, and may be spaced apart in the forward direction from the front surface of each of the first body 311, the second body 321, and the third body 331.

Accordingly, the display panel 1 may be disposed between the body 311, 321, 331 of the module cover 3 and the left guide 312a, 322a, 332a or the right guide 313a, 323a, 333a. That is, the left guide 312a, 322a, 332a and the right guide 313a, 323a, 333a may guide the coupling of the display panel 1 to the base 2 and/or the module cover 3, and may prevent the display panel 1 from being separated from the base 2 and/or the module cover 3. Accordingly, the display panel 1 may be bent or unfolded together with the module cover 3.

Referring to FIGS. 4 and 5, the left cover 312, 322, 332 and the right cover 313, 323, 333 may be symmetrical left and right. The first left cover 312, the second left cover 322, and the third left cover 332 may have a shape identical to each other. The second left cover 322 may be located in the upper side of the first left cover 312, and cover at least a portion of the forward direction of the first left cover 312. The third left cover 332 may be located in the upper side of the second left cover 322, and cover at least a portion of the forward direction of the second left cover 322.

For example, the first left cover 312 may have a pentagonal longitudinal cross-section. That is, the first left cover 312 may have pentagonal left surface and right surface, and may have five side surfaces between the left surface and the right surface.

A first side E1, a second side E2, a third side E3, a fourth side E4, and a fifth side E5 may be connected to the left surface and the right surface of the first left cover 312 to form an edge. The first side E1 may form a front surface of the first left cover 312, the second side E2 may form a rear surface of the first left cover 312, and the first side E1 and the second side E2 may be parallel. In the up-down direction, the position of the lower end of the first side E1 and the position of the lower end of the second side E2 may be the same, but the position of the upper end of the first side E1 may be lower than the position of the upper end of the second side E2. That is, the length of the second side E2 may be larger than the length of the first side E1. The third side E3 may be connected to the upper end of the first side E1 and the upper end of the second side E2. That is, the third side E3 may extend to be inclined with respect to the first side E1 and the second side E2, and may be inclined by a first angle theta 1 with respect to a vertical line VL. The fourth side E4 may be connected to the lower end of the first side E1 and extend to be inclined downward, and the fifth side E5 may be connected to the lower end of the second side E2 and extend to be inclined downward. The angle between the fourth side E4 and the fifth side E5 may be 90 degrees or smaller.

The third side E3 of the first left cover 312 may face the fifth side E5 of the second left cover 322, and the third side E3 of the second left cover 322 may face the fifth side E5 of the third left cover 332. In this case, a portion of the third side E3 may contact or be adjacent to at least a portion of the fifth side E5.

Accordingly, when the fifth side E5 contacts the third side E3, the fifth side E5 may be disposed parallel to the third side E3. That is, the clockwise rotation of the second left cover 322 may be restricted by the contact of the second left cover 322 to the first left cover 312, and the clockwise rotation of the third left cover 332 may also be restricted by the contact of the third left cover 332 to the second left cover 312.

Referring to FIG. 6, a first left cover 312', the second left cover 322', and the third left cover 332' may have a shape identical to each other. The second left cover 322' may be located in the upper side of the first left cover 312', and cover at least a portion of the forward direction of the first left cover 312'. The third left cover 332' may be located in the upper side of the second left cover 322', and cover at least a portion of the forward direction of the second left cover 322'.

For example, the first left cover 312' may have a rectangular longitudinal cross-section. That is, the first left cover 312' may have rectangular left surface and right surface, and may have four side surfaces between the left surface and the right surface.

A first side E1', a second side E2', a third side E3', and a fourth side E4' may be connected to the left surface and the right surface of a first left cover 312' to form an edge. The first side E1' may form a front surface of the first left cover 312', the second side E2' may form a rear surface of the first left cover 312', and the first side E1' and the second side E2' may be parallel. In the up-down direction, the position of the lower end of the first side E1' and the position of the lower end of the second side E2' may be the same, but the position of the upper end of the first side E1' may be higher than the position of the upper end of the second side E2'. That is, the length of the first side E1' may be larger than the length of the second side E2'. The third side E3' may be connected to the upper end of the first side E1' and the upper end of the second side E2'. That is, the third side E3' may extend to be inclined with respect to the first side E1' and the second side E2'. The fourth side E4' may be connected to the lower end of the first side E1' and the lower end of the second side E2'.

The first side E1' of the first left cover 312' may face the second side E2' of the second left cover 322', and the first side E1' of the second left cover 322' may face the second side E2' of the third left cover 332'. In this case, a portion of the first side E1' may contact or be adjacent to at least a portion of the second side E2'.

Accordingly, when the second side E2' contacts the first side E1', the second side E2' may be disposed parallel to the first side E1'. That is, the clockwise rotation of the second left cover 322' may be restricted by the contact of the second left cover 322' to the first left cover 312', and the clockwise rotation of the third left cover 332' may also be restricted by the contact of the third left cover 332' to the second left cover 312'.

Referring to FIGS. 7 and 8, the display device 10 may include a display panel 11, a module cover 13, a housing 14, and a roller 15. In this case, the display panel 11 may be a flexible display panel. For example, the display panel 11 may be an organic light emitting diode (OLED) panel or a plastic OLED (POLED) panel. Accordingly, the display panel 11 may be bent. The display panel 11 may extend long in the up-down direction.

The module cover 13 may be coupled to the display panel 11 in the rearward direction of the display panel 11. For example, the module cover 13 may be coupled to the rear surface of the display panel 11 through an adhesive member such as a double-sided tape. The module cover 13 is provided with a plurality of segments sequentially disposed in the up-down direction of the display panel 11, and may be bent or unfolded.

The housing 14 may extend long in the left-right direction. The housing 14 may be formed in a cylindrical shape as a whole. The housing 14 may have an opening (no reference numeral) through which the display panel 11 and the module cover 13 pass. For example, the housing 14 may include a first housing 14a and a second housing 14b that are detachably coupled to each other.

The roller 15 extends long in the left-right direction, and may be installed in the inner space of the housing 14. The roller 15 may be fixed to one end or the lower end of the display panel 11 and/or the module cover 13. Meanwhile, the roller 15 may be referred to as a panel roller.

Accordingly, when the roller 15 rotates, the display panel 11 and the module cover 13 may be wound around or unwound from the roller 15. For example, a rod 151 may be provided in one side of the roller 15, and fixed to a rotation shaft of a motor (not shown). In this case, when the motor is driven, the roller 15 rotates in a first rotation direction so that the display panel 11 and the module cover 13 are automatically wound around the roller 15 and descend, or the roller 15 rotates in a second rotation direction opposite to the first rotation direction so that the display panel 11 and the module cover 13 are automatically unwound from the roller 15 and ascend.

Meanwhile, a peripheral device C such as a camera or a microphone may be installed in the housing 14.

Referring to FIGS. 9 and 10, the module cover 3 may include n segments that are hinged to each other. Here, n may be a natural number of 5 or more. The module cover 3 may include a lower segment 13a, middle segments 13b, and an upper segment 13c. The middle segments 13b may be disposed between the lower segment 13a and the upper segment 13c. Meanwhile, the lower segment 13a may be referred to as a first end segment, and the upper segment 13c may be referred to as a second end segment.

The lower segment 13a may form the lower end of the module cover 3. The lower segment 13a may be fixed to the outer circumferential surface of the roller 15. For example, the lower segment 13a may be disposed between a pair of disks 152 and 153 coupled to the outer circumferential surface of the roller 15. The lower segment 13a may include a lower body 1311, a lower left cover 1312, and a lower right cover 1313. The lower body 1311 may extend long in the left-right direction of the display panel 11 and be fixed to the outer circumferential surface of the roller 15, and may have a flat front surface. The lower left cover 1312 may be provided in the left side of the lower body 1311, and the lower right cover 1313 may be provided in the right side of the lower body 1311.

The lower holder 131*b* may be formed in the upper end of the lower body 1311, and a lower shaft hole (no reference numeral) may be formed by penetrating the lower holder 131*b* in the left-right direction. For example, the lower holder 131*b* may include a plurality of lower holders spaced apart from each other in the left-right direction.

The number of the middle segments 13*b* may be less than the number of total segments of the module cover 3 by two. As the number of middle segments 13*b* increases, the module cover 3 may be wound around the roller 15 with a greater curvature. A middle segment forming a lower end of the middle segment 13*b* among the middle segments 13*b* may be hinged to the lower segment 13*a*. A middle segment forming an upper end of the middle segment 13*b* among the middle segments 13*b* may be hinged to the upper segment 13*c*. For example, the middle segments 13*b* may have a shape identical to each other.

A first middle segment 132 may include a first body 1321, a first left cover 1322, and a first right cover 1323. The first body 1321 may extend long in the left-right direction of the display panel 11, and may have a flat front surface. The first left cover 1322 may be provided in the left side of the first body 1321, and the first right cover 1323 may be provided in the right side of the first body 1321.

A first lower holder 132*a* may be formed in the lower end of the first body 1321, and a first lower shaft hole (no reference numeral) may be formed by penetrating the first lower holder 132*a* in the left-right direction. For example, the first lower holder 132*a* may include a plurality of first lower holders spaced apart from each other in the left-right direction. A first upper holder 132*b* may be formed in the upper end of the first body 1321, and a first upper shaft hole (no reference numeral) may be formed by penetrating the first upper holder 132*b* in the left-right direction. For example, the first upper holder 132*b* may include a plurality of first upper holders spaced apart from each other in the left-right direction.

A second middle segment 133 may include a second body 1331, a second left cover 1332, and a second right cover 1333. The second body 1331 may extend long in the left-right direction of the display panel 11, and may have a flat front surface. The second left cover 1332 may be provided in the left side of the second body 1331, and the second right cover 1333 may be provided in the right side of the second body 1331.

A second lower holder 133*a* may be formed in the lower end of the second body 1331, and a second lower shaft hole (no reference numeral) may be formed by penetrating the second lower holder 133*a* in the left-right direction. For example, the second lower holder 133*a* may include a plurality of second lower holders spaced apart from each other in the left-right direction. A second upper holder 133*b* may be formed in the upper end of the second body 1331, and a second upper shaft hole (no reference numeral) may be formed by penetrating the second upper holder 133*b* in the left-right direction. For example, the second upper holder 133*b* may include a plurality of second upper holders spaced apart from each other in the left-right direction.

A third middle segment 134 may include a third body 1341, a third left cover 1342, and a third right cover 1343. The third body 1341 may extend long in the left-right direction of the display panel 11 and may have a flat front surface. The third left cover 1342 may be provided in the left side of the third body 1341, and the third right cover 1343 may be provided in the right side of the third body 1341.

A third lower holder 134*a* may be formed in the lower end of the third body 1341, and a third lower shaft hole (no reference numeral) may be formed by penetrating the third lower holder 134*a* in the left-right direction. For example, the third lower holder 134*a* may include a plurality of third lower holders spaced apart from each other in the left-right direction. A third upper holder 134*b* may be formed in the upper end of the third body 1341, and a third upper shaft hole (no reference numeral) may be formed by penetrating the third upper holder 134*b* in the left-right direction. For example, the third upper holder 134*b* may include a plurality of third upper holders spaced apart from each other in the left-right direction.

The first lower holder 132*a* may be hinged to the lower holder 131*b* adjacent to the first lower holder 132*a*. A lower hinge shaft 16*a* (not shown) extends long in the left-right direction, and may be inserted into the first lower shaft hole of the first lower holder 132*a* and the lower shaft hole of the lower holder 131*b*. That is, the center of the lower hinge shaft 16*a* may be aligned with the center of the first lower shaft hole and the center of the lower shaft hole. Accordingly, the first middle segment 132 may be rotated about the lower hinge shaft 16*a* with respect to the lower segment 13*a*.

The second lower holder 133*a* may be hinged to the first upper holder 132*b* adjacent to the second lower holder 133*a*. A first hinge shaft 161 (not shown) extends long in the left-right direction, and may be inserted into the second lower shaft hole of the second lower holder 133*a* and the first upper shaft hole of the first upper holder 131*b*. That is, the center of the first hinge shaft 161 may be aligned with the center of the second lower shaft hole and the center of the first upper shaft hole. Accordingly, the second middle segment 133 may be rotated about the first hinge shaft 161 with respect to the first middle segment 132.

The third lower holder 134*a* may be hinged to the second upper holder 133*b* adjacent to the third lower holder 134*a*. A second hinge shaft 162 (not shown) extends long in the left-right direction, and may be inserted into the third lower shaft hole of the third lower holder 134*a* and the second upper shaft hole of the second upper holder 133*b*. That is, the center of the second hinge shaft 162 may be aligned with the center of the third lower shaft hole and the center of the second upper shaft hole. Accordingly, the third middle segment 134 may be rotated about the second hinge shaft 162 with respect to the second middle segment 133.

For example, the number of middle segments 13*b* may be five or more. In this case, the middle segments excluding the first middle segment 132, the second middle segment 133, and the third middle segment 134, among the middle segments 13*b*, are sequentially arranged upward from the third middle segment 134, and may have the same shape as the third middle segment 134.

The upper segment 13*c* may form an upper end of the module cover 3. The upper segment 13*c* may include an upper body 13*n*1, an upper left cover 13*n*2, and an upper right cover 13*n*3. The upper body 13*n*1 may extend long in the left-right direction of the display panel 11 and may have a flat front surface. The upper left cover 13*n*2 may be provided in the left side of the lower body 13*n*1, and the upper right cover 13*n*3 may be provided in the right side of the lower body 13*n*1.

The upper holder 13*na* may be formed in the lower end of the upper body 13*n*1, and the upper shaft hole (no reference numeral) may be formed by penetrating the upper holder 13*na* in the left-right direction. For example, the upper holder 13*na* may include a plurality of upper holders spaced apart from each other in the left-right direction.

In addition, the upper segment 13*c* may be hinged to the middle segment 13*b* adjacent to the upper segment 13*c*. The upper hinge shaft 16*c* (not shown) may extend long in the left-right direction, and may be inserted into the upper shaft hole of the upper holder 13*na* and the shaft hole of the upper holder (see 134*b*) of the middle segment 13*b* adjacent to the upper segment 13*c*. That is, the center of the upper hinge shaft 16*c* may be aligned with the center of the upper shaft hole and the center of the shaft hole. Accordingly, the upper segment 13*c* may be rotated about the upper hinge shaft 16*c* with respect to the middle segment 13*b*.

Accordingly, the module cover 3 may be wound around or unwound from the roller 15.

Referring to FIGS. 10 and 11, the first left cover 1322, the second left cover 1332, and the third left cover 1342 may cover the left surface of the display panel 11. The first right cover 1323, the second right cover 1333, and the third right cover 1343 may cover the right surface of the display panel 11.

Each of a first left guide 1322*a*, a second left guide 1332*a*, and a third left guide 1342*a* may protrude to the right side from each of the first left cover 1322, the second left cover 1332, and the third left cover 1342, and may be spaced apart in the forward direction from the front surface of each of the first body 1321, the second body 1331, and the third body 1341. Each of a first right guide 1323*a*, a second right guide 1333*a*, and a third right guide 1343*a* may protrude to the left side from each of the first right cover 1323, the second right cover 1333, and the third right cover 1343, and may be spaced apart in the forward direction from the front surface of each of the first body 1321, the second body 1331, and the third body 1341.

In addition, a lower left guide 1312*a* may protrude to the right side from the lower left cover 1312, and be spaced apart from the lower body 1311 in the forward direction (see FIG. 9). In addition, a lower right guide 1313*a* may protrude to the left side from the lower right cover 1313, and be spaced apart from the lower body 1311 in the forward direction (see FIG. 9).

Accordingly, the display panel 11 may be disposed between the body 1311, 1321, 1331, 1341 of the module cover 13 and the left guide 1312*a*, 1322*a*, 1332*a*, 1342*a* or the right guide 1313*a*, 1323*a*, 1333*a*, 1343*a*. For example, the display panel 11 may move upward from the lower side of the module cover 13, and may be inserted into between the body 1311, 1321, 1331, 1341 and the left guide 1312*a*, 1322*a*, 1332*a*, 1342*a* or the right guide 1313*a*, 1323*a*, 1333*a*, 1343*a*. That is, the left guide 1312*a*, 1322*a*, 1332*a*, 1342*a* and the right guide 1313*a*, 1323*a*, 1333*a*, 1343*a* may guide the coupling of the display panel 11 to the module cover 13, and may prevent the display panel 11 from being separated from the module cover 13.

The adhesive member 19 may be coupled to the body 1311, 1321, 1331, 1341 and the display panel 11 at between the body 1311, 1321, 1331, 1341 and the display panel 11. For example, the adhesive member 19 may be a double-sided tape. A distance between the body 1311, 1321, 1331, 1341 and the left guide 1312*a*, 1322*a*, 1332*a*, 1342*a* or the right guide 1313*a*, 1323*a*, 1333*a*, 1343*a* may be h1. A distance between the center of the left cover 1322, 1332, 1342 or the right cover 1323, 1333, 1343 and the center of the display panel 11 may be d1.

In addition, a left boss may protrude in the rearward direction from the left guide 1312*a*, 1322*a*, 1332*a*, 1342*a*. A right boss may protrude in the rearward direction from the right guide 1313*a*, 1323*a*, 1333*a*, 1343*a*. For example, a first left boss 1322*c* may protrude in the rearward direction from the rear surface of the first left guide 1322*a*, and penetrate the display panel 11. For example, a first right boss 1323*c* may protrude in the rearward direction from the rear surface of the first right guide 1323*a*, and penetrate the display panel 11.

In this case, the display panel 11 may include a slot into which the left boss or the right boss is inserted, and which is formed to be elongated in the up-down direction. The slot may be adjacent to the left side or the right side of the display panel 11.

Referring to FIGS. 9 and 12, a portion of the front surface of the display panel 11 may be caught by the left guide 1312*a*, 1322*a*, 1332*a*, 1342*a* and the right guide 1313*a*, 1323*a*, 1333*a*, 1343*a*.

A lower left slot 111*a* may be adjacent to the lower side of the display panel 11, and may be formed to be elongated in the up-down direction. A lower left boss 1312*c* may protrude in the rearward direction from the rear surface of the lower left guide 1312*a*, and be inserted into the lower left slot 111*a*.

A lower right slot 111*b* may be adjacent to the lower side of the display panel 11, and may be formed to be elongated in the up-down direction. A lower right boss 1313*c* may protrude in the rearward direction from the rear surface of the lower right guide 1313*a*, and be inserted into the lower right slot 111*b*.

A left slot 111*c* may be formed elongated in the up-down direction at between the lower left slot 111*a* and the upper side of the display panel 11. The first left boss 1322*c*, a second left boss 1332*c*, and a third left boss 1342*c* may be inserted into the left slot 111*c*. The first left boss 1322*c* may protrude in the rearward direction from the rear surface of the first left guide 1322*a*. The second left boss 1332*c* may protrude in the rearward direction from the rear surface of the second left guide 1332*a*. The third left boss 1342*c* may protrude in the rearward direction from the rear surface of the third left guide 1342*a*.

A right slot 111*d* may be elongated in the up-down direction at between the lower right slot 111*b* and the upper side of the display panel 11. The first right boss 1323*c*, a second right boss 1333*c*, and a third right boss 1343*c* may be inserted into the right slot 111*d*. The first right boss 1323*c* may protrude in the rearward direction from the rear surface of the first right guide 1323*a*. The second right boss 1333*c* may protrude in the rearward direction from the rear surface of the second right guide 1333*a*. The third right boss 1343*c* may protrude in the rearward direction from the rear surface of the third right guide 1343*a*.

Accordingly, even when the display panel 11 and the module cover 13 are bent together with a different curvature, a boss is provided to be movable with respect to the slot, so that the display panel 11 and the module cover 13 can be bent or unfolded smoothly.

Referring to FIGS. 9 and 13, the lower left slot 111*a* may be adjacent to a lower side of the display panel 11, and formed to be elongated in the up-down direction. The lower left boss 1312*c* may protrude in the rearward direction from the rear surface of the lower left guide 1312a, and be inserted into the lower left slot 111a.

The lower right slot 111b may be adjacent to the lower side of the display panel 11, and may be formed to be elongated in the up-down direction. The lower right boss 1313c may protrude in the rearward direction from the rear surface of the lower right guide 1313a, and be inserted into the lower right slot 111b.

Left slots 111c' may be disposed between the lower left slot 111a and the upper side of the display panel 11, and each of the left slots 111c' may be elongated in the up-down direction. The number of left slots 111c' may be the same as the number of middle segments 13b. That is, the first left boss 1322c may be inserted into a first left slot 111ca', the second left boss 1332c may be inserted into a second left slot 111cb', and the third left boss 1342c may be inserted into a third left slot 111cc'.

Right slots 111d' may be disposed between the lower right slot 111b and the upper side of the display panel 11, and each of the right slots 111d' may be formed to be elongated in the up-down direction. The number of right slots 111d' may be the same as the number of middle segments 13b. That is, the first right boss 1323c may be inserted into a first right shaft slot 111da', the second right boss 1333c may be inserted into a second right slot 111db', and the second right boss 1343c may be inserted into a third right slot 111dc'.

Accordingly, even when the display panel 11 and the module cover 13 are bent together with a different curvature, the boss is provided to be movable with respect to the slot, so that the display panel 11 and the module cover 13 may be bent or unfolded smoothly.

Referring back to FIGS. 9 and 12, a first elastic member 17a may be inserted into the left cover 1312, 1322, 1332, 1342. A second elastic member 17b may be inserted into the right cover 1313, 1323, 1333, 1343. The first elastic member 17a and the second elastic member 17b may be a spring that extends long in the up-down direction of the display panel 11.

Left holes 1312b, 1322b, 1332b, and 1342b may be formed by penetrating the left cover 1312, 1322, 1332, 1342 in the up-down direction, and the first elastic member 17a may be inserted into the left hole 1312b, 1322b, 1332b, 1342b.

Right holes 1313b, 1323b, 1333b, and 1343b may be formed by penetrating the right cover 1313, 1323, 1333, 1343 in the up-down direction, and the second elastic member 17b may be inserted into the right hole 1313b, 1323b, 1333b, 1343b.

Accordingly, the first elastic member 17a and the second elastic member 17b may be bent or unfolded together with the display panel 11 and the module cover 13. In addition, the first elastic member 17a and the second elastic member 17b may help the module cover 13 to stand up or maintain an upright posture. Preferably, the elastic modulus of the first elastic member 17a and the second elastic member 17b may be the same.

Referring to FIGS. 14 and 15, a link 18 may be located in the rearward direction of the module cover 13. One side of the link 18 may be pivotably connected to the housing 14, and the other side of the link 18 may be movably connected to the module cover 13. The link 18 may include a first link 181 and a second link 182.

The first link 181 may extend long in the left-right direction, and be fixed to the housing 14. The first link 181 may be adjacent to an opening 140P (see FIG. 17) through which the display panel 11 of the housing 14 and the module cover 13 pass.

The second link 182 may extend long in a direction intersecting with the length direction of the first link 181. A link slot 180S may be closer to the other end than one end of the second link 182, may be formed by penetrating the second link 182, and may be formed to be elongated in the length direction of the second link 182. One end of the second link 182 may be pivotally coupled to a distal end of the first link 181.

In addition, the first link 181 and the second link 182 may be spaced apart in the rearward direction from the module cover 13.

A slider 183 may protrude in the rearward direction from the rear surface of a target segment 13s which is one of a plurality of segments of the module cover 13. For example, the target segment 13s may be spaced apart downward from the upper side of the module cover 13 by a certain distance hs. In this case, when the winding of the module cover 13 with respect to the roller 15 (see FIG. 8) is completed, the target segment 13s may be located inside the housing 14, but the segment located in the upper side than the target segment 13s may be located outside the housing 14.

Then, the slider 183 may be inserted into the link slot 180S, and may move along the link slot 180S. The slider 183 may include an elongated body 1831 and a head 1832 that is formed in a distal end of the body 1831 and caught by the second link 182. That is, the link slot 180S may be located between the target segment 13s and the head 1832.

Accordingly, the display panel 11 and the module cover 13 may be stably supported without being tilted back and forth by the link 18.

Then, when the display panel 11 and the module cover 13 are wound around the roller 15 (see FIG. 8), the slider 183 may slide in the link slot 180S in a direction from the other end of the second link 182 toward one end. In this case, the second link 182 may be pivoted about the distal end of the second link 182 pivotally connected to the first link 181, and may be closer to the first link 181. In other words, when the display panel 11 and the module cover 13 are wound around the roller 15, the second link 182 may be folded toward the first link 181. When the display panel 11 and the module cover 13 are unwound from the roller 15, the second link 182 may be separated from the first link 181.

Referring to FIGS. 16 and 17, the second housing 14b may include a seating portion 142 on which the remaining segments are mounted. Here, the remaining segments may be segments located above the target segment 13s. That is, when the winding of the module cover 13 with respect to the roller 15 is completed, the remaining segments may be seated on or wound around the seating portion 142.

An insertion portion 13nb may be formed in the upper end of the upper segment 13c, and may be formed in a wedge shape as a whole. A holder 1421 may be formed by being bent at least once in the distal end of the seating portion 142. At this time, an insertion groove (no reference numeral) may be formed between the seating portion 142 and the holder 1421, and the insertion portion 13nb may be detachably inserted into the insertion groove.

Meanwhile, an idler 145 may be rotatably coupled to the inner surface of the housing 14. The idler 145 may be in contact with the front surface of the display panel 11, and may rotate in response to the movement of the display panel 11. For example, the idler 145 may include a plurality of idlers spaced apart from each other along the circumferential direction of the housing 14. Meanwhile, the idler 145 may be referred to as an idle roller or an idle wheel.

Accordingly, winding or unwinding of the display panel 11 and the module cover 13 with respect to the roller 15 may be smoothly performed by the idler 145.

Referring to FIGS. 18 and 19, the display device 20 may include a display panel 21, a base 22, a module cover 23, a housing 24, and a roller 25. In this case, the display panel 21 may be a flexible display panel. For example, the display panel 21 may be an organic light emitting diode (OLED) panel or a plastic OLED (POLED) panel. Accordingly, the display panel 21 may be bent. The display panel 21 may extend long in the up-down direction.

The base 22 may be coupled to the display panel 21 in the rearward direction of the display panel 21. For example, the base 22 may be coupled to the rear surface of the display panel 21 through an adhesive member such as a double-sided tape. The base 22 may extend long in the up-down direction. The base 22 may include a rubber, urethane, or silicone material.

The module cover 23 may be coupled to the base 22 in the rearward direction of the base 22. For example, the module cover 23 may be coupled to the rear surface of the base 22 through an adhesive member such as a double-sided tape. For another example, the module cover 23 may be fastened to the base 22 through a fastening member such as a screw. The module cover 23 may include a plurality of segments sequentially disposed in the up-down direction of the display panel 21. In this case, the plurality of segments may be spaced apart from each other. For example, the segment may include a plastic or metal material.

The housing 24 may extend long in the left-right direction. The housing 24 may be formed in a cylindrical shape as a whole. The housing 24 may include an opening 24P through which the display panel 21, the base 22, and the module cover 23 pass. For example, the housing 24 may include a first housing 24a and a second housing 24b that are detachably coupled to each other.

The roller 25 extends long in the left-right direction, and may be installed in the inner space of the housing 24. The roller 25 may be fixed to one end or the lower end of the display panel 21, the base 22, and/or the module cover 23. Meanwhile, the roller 25 may be referred to as a panel roller.

Accordingly, when the roller 25 rotates, the display panel 21, the base 22, and the module cover 23 may be wound around or unwound from the roller 25. For example, a rod 251 may be provided in one side of the roller 25, and fixed to a rotation shaft of a motor (not shown). In this case, when the motor is driven, the roller 25 rotates in a first rotational direction so that the display panel 21, the base 22, and the module cover 23 may be automatically wound around the roller 25 and descend, or the roller 25 rotates in a second rotational direction opposite to the first rotational direction so that the display panel 21, the base 22, and the module cover 23 may be automatically unwound from the roller 25 and ascend.

Meanwhile, an idler 245 may be rotatably coupled to the inner surface of the housing 24. The idler 245 contacts the front surface of the display panel 21, and may rotate in response to movement of the display panel 21. For example, the idler 245 may include a plurality of idlers spaced apart from each other along the circumferential direction of the housing 24. Meanwhile, the idler 245 may be referred to as an idle roller or an idle wheel.

Accordingly, winding or unwinding of the display panel 21, the base 22, and the module cover 23 with respect to the roller 25 may be smoothly performed by the idler 245.

Meanwhile, a control box 27 may be provided on the outer circumferential surface of the housing 24. The control box 27 may be located in the rearward direction of the module cover 23. For example, the control box 27 may extend long in the left-right direction, and may be disposed parallel to the display panel 21. A controller, a main board, or a printed circuit board (PCB) may be built in the control box 27.

Referring to FIGS. 18 and 20, the base 22 may include a first part 221, a second part 222, and a third part 223. The first part 221 may extend long in the up-down direction of the display panel 21, and may have a front surface facing the rear surface of the display panel 21. The second part 222 may protrude toward the display panel 21 from the circumference of the first part 221. The third part 223 may protrude or bend in the forward direction of the display panel 21 from the distal end of the second part 222.

The display panel 21 may be disposed between the first part 221 and the third part 223. An adhesive member 29 may be coupled to the display panel 21 and the first part 221 at between the display panel 21 and the first part 221. The adhesive member 29 may be a double-sided tape. In this case, a boundary surface between the display panel 21 and the adhesive member 29 may be located on a virtual plane C3 passing through a center of the second part 222.

Accordingly, when the display panel 21 and the module cover 13 are bent or unfolded together, a slip of the display panel 21 with respect to the adhesive member 29 can be minimized.

Referring to FIG. 21, the module cover 23 may include a plurality of segments 231 spaced apart from each other in the up-down direction of the display panel 21. Each of the plurality of segments 231 may extend in the left-right direction of the display panel 21. A plurality of segments 231 may be fixed or coupled to the base 22.

A hole 23a, 23b may be formed by penetrating the segment 231 in the up-down direction. For example, the hole 23a, 23b may include a first hole 23a and a second hole 23b that are spaced apart from each other in the left-right direction. For another example, the hole 23a, 23b may include two or more pairs of holes.

A first elastic member 27a may be inserted into the first hole 23a. A second elastic member 27b may be inserted into the second hole 23b. The first elastic member 27a and the second elastic member 27b may be a spring extending long in the up-down direction of the display panel 21.

Accordingly, the first elastic member 27a and the second elastic member 27b may be bent or unfolded together with the display panel 21, the base 22, and the module cover 23. In addition, the first elastic member 27a and the second elastic member 27b may help the module cover 23 to stand up or maintain an upright posture. Preferably, the elastic modulus of the first elastic member 27a and the second elastic member 27b may be the same.

Meanwhile, the module cover 23 may include a holder 26 located in the upper sides of the segments 231. The holder 26 may be fixed or coupled to the rear surface of the base 22. The holder 26 extends long in the left-right direction of the display panel 21, and the height of the holder 26 in the up-down direction of the display panel 21 may be larger than the height of the segment 231. For example, the height of the holder 26 in the up-down direction may be substantially the same as the height of the control box 27 (see FIG. 20).

Meanwhile, the supporter 28 may be located outside the housing 24 and located in the rearward direction of the module cover 23. One side of the supporter 28 may be fixed to the module cover 23, and the other side may be coupled to the housing 24. The supporter 28 may be elongated in the up-down direction, and may be stretched or compressed in the up-down direction.

For example, the supporter 28 may include a first supporter 281, a second supporter 282, and a third supporter 283 that respectively extend long in the up-down direction. The second supporter 282 may be movably coupled to the first supporter 281 in the up-down direction. The third supporter 283 may be movably coupled to the second supporter 282 in the up-down direction. In addition, the third supporter 283 may be fixed to the holder 26.

Accordingly, the display panel 21 and the base 22 may be stably supported without being tilted back and forth by the supporter 28.

Referring to FIGS. 22 to 24, the control box 27 may form a space 27S opened in the forward direction. A pair of ribs 271 are installed in the space 27S, and may be spaced apart from each other in the left-right direction. Each of a pair of first rails 2711 may be formed in an inner side of each of a pair of ribs 271. A stopper 272 extends long in the left-right direction, and may be provided in the lower end of the pair of ribs 271. A first stopper may be formed in the upper end of the pair of first rails 2711.

Referring to FIG. 22, a cross-section of the first supporter 281 may be in the shape of a square bracket. That is, the first supporter 281 may include a first body forming a rear surface of the first supporter 281, and a pair of first wings protruding in the forward direction from the left and right sides of the first body.

The pair of first wings of the first supporter 281 may be slide-coupled to the pair of first rails 2711. Accordingly, the first supporter 281 may move downward along the pair of first rails 2711 and may be inserted into a space between the pair of ribs 271, or may move upward and be located outside the control box 27. In this case, the downward movement of the first supporter 281 may be restricted by a contact between the lower end of the first supporter 281 and the stopper 272, and the upward movement of the first supporter 281 may be restricted by a contact between the lower end of the first supporter 281 and the first stopper.

In addition, each of a pair of second rails 2811 may be formed in an inner side of each of the pair of first wings. A second stopper may be formed in the upper end of the pair of second rails 2811.

Referring to FIG. 23, the cross-section of the second supporter 282 may be a shape of square bracket smaller than the cross-section of the first supporter 281. That is, the second supporter 282 may include a second body forming the rear surface of the second supporter 282, and a pair of second wings protruding in the forward direction from the left and right sides of the second body.

The pair of second wings of the second supporter 282 may be slide-coupled to the pair of second rails 2811. Accordingly, the second supporter 282 may move downward along the pair of second rails 2811 and may be inserted into a space between the pair of first wings, and may move upward and may be located outside the control box 27. In this case, the downward movement of the second supporter 282 may be restricted by a contact between the lower end of the second supporter 282 and the stopper 272, and the upward movement of the second supporter 282 may be restricted by a contact between the lower end of the second supporter 282 and the second stopper.

In addition, each of a pair of third rails 2821 may be formed in an inner side of each of a pair of second wings. A third stopper may be formed in the upper end of the pair of third rails 2821.

Referring to FIG. 24, the cross-section of the third supporter 283 may have a H beam shape smaller than the cross-section of the second supporter 282. That is, the third supporter 283 may be slide-coupled to the pair of third rails 2821. Accordingly, the third supporter 283 may move downward along the pair of third rails 2821 and may be inserted into a space between the pair of second wings, or may move upward and may be located outside the control box 27. In this case, the downward movement of the third supporter 283 may be restricted by a contact between the lower end of the third supporter 283 and the stopper 272, and the upward movement of the third supporter 283 may be restricted by a contact between the lower end of the third supporter 283 and the third stopper.

Accordingly, the supporter 28 supports the display panel 21, the base 22, and the module cover 23, while the length may be adjusted in response to winding or unwinding of the display panel 21, the base 22, and the module cover 23 with respect to the roller 25.

Referring to FIG. 18, the display panel 21, the base 22, and the module cover 23 may ascend while being unwound from the roller 25. In this case, the display panel 21 may maintain an upright posture with respect to the housing 24.

Referring to FIG. 25, the display panel 21, the base 22, and the module cover 23 may descend while being wound around the roller 25. In this case, a portion of the display panel 21 may display a screen to a user or the like in the forward direction of the control box 27.

According to an aspect of the present disclosure, provided is a display device including: a flexible display panel; a module cover positioned behind of the display panel and coupled to the display panel, the module cover having a plurality of segments which respectively extend long in a left-right direction of the display panel, and which are sequentially arranged in an up-down direction of the display panel; and a hinge shaft which is disposed between the plurality of segments, and to which the plurality of segments are rotatably coupled.

In addition, according to another aspect of the present disclosure, the plurality of segments may include a first segment and a second segment that are coupled to each other by the hinge shaft, wherein the second segment may be rotatable about the hinge shaft with respect to the first segment.

In addition, according to another aspect of the present disclosure, the first segment may include: a first body having a front surface facing the display panel; a first left cover provided in a left of the first body, and covering a left surface of the display panel; and a first right cover provided in a right of the first body, and covering a right surface of the display panel, wherein the second segment may include: a second body having a front surface facing the display panel; a second left cover provided in a left of the second body, and covering a left surface of the display panel; and a second right cover provided in a right of the second body, and covering a right surface of the display panel, wherein the second left cover may be positioned above the first left cover, and may cover at least a portion of a front of the first left cover.

In addition, according to another aspect of the present disclosure, the first left cover may include a first side facing the second left cover, wherein the second left cover may include a second side facing the first left cover, wherein the second side may cover at least a portion of the first side in front of the first side, and when the second side contacts the first side, may be disposed parallel to the first side.

In addition, according to another aspect of the present disclosure, the first segment may further include: a first left guide which protrudes to a right from the first left cover, and which is spaced in a forward direction from the first body; and a first right guide which protrudes to a left from the first right cover, and which is spaced in a forward direction from the first body, wherein the display panel may be disposed between the first body and the first left guide or the first right guide, and the display device may further include an adhesive member coupled to the display panel and the first body between the display panel and the first body.

In addition, according to another aspect of the present disclosure, the first segment may further include: a first left boss protruding in a rearward direction from a rear surface of the first left guide; and a first right boss protruding in a rearward direction from a rear surface of the first right guide, wherein the display panel may further include: a left slot which is adjacent to a left side of the display panel, which extends long in an up-down direction, and through which the first left boss passes; and a right slot which is adjacent to a right side of the display panel, which extends long in an up-down direction, and through which the second left boss passes.

In addition, according to another aspect of the present disclosure, the first segment may further includes: a left hole formed by penetrating the first left cover in an up-down direction; and a right hole formed by penetrating the first right cover in the up-down direction, and the display device may further include: a first elastic member which has elasticity, which extends long in an up-down direction of the display panel, and which is inserted into the left hole; and a second elastic member which has elasticity, which extends long in the up-down direction of the display panel, and which is inserted into the right hole.

In addition, according to another aspect of the present disclosure, the display device may further include: a roller which extends long in a length direction of the segment, and around which the display panel and the module cover are wound, or from which the display panel and the module cover are unwound; a housing which provides an inner space in which the roller is installed, and which has an opening through which the display panel and the module cover pass; and a link which is located in a rearward direction of the module cover, which has one end pivotably connected to the housing, and which has the other end movably connected to the module cover.

In addition, according to another aspect of the present disclosure, the module cover may further include a slider protruding in a rearward direction from any one of the plurality of segments, wherein the link may further include: a first link which extends long in a length direction of the roller, and which is fixed to the housing adjacent to the opening; and a second link which extends long in a direction intersecting with a length direction of the first link, and which has one end pivotally coupled to a distal end of the first link, wherein the second link may include a link slot which is closer to the other end of the second link than to one end, which is formed long in a length direction of the second link, and to which the slider is movably coupled, wherein when the display panel and the module cover are wound around the roller, the second link may be folded toward the first link, as the slider slides from the other end of the second link toward one end of the second link in the link slot, and when the display panel and the module cover are unwound from the roller, may be unfolded from the first link, as the slider slides from one end of the second link toward the other end of the second link in the link slot.

In addition, according to another aspect of the present disclosure, the display device may further include an idler which is rotatably coupled to an inner surface of the housing, and which is in contact with a front surface of the display panel.

In addition, according to another aspect of the present disclosure, provided may be a display device including: a flexible display panel;
    a module cover positioned behind the display panel and coupled to the display panel, the module cover having a plurality of segments which respectively extend long in a left-right direction of the display panel, and which are spaced apart from each other in an up-down direction of the display panel; a roller which extends long in a length direction of the segment, and around which the display panel and the module cover are wound, or from which the display panel and the module cover are unwound; and an elastic member which has elasticity, and which extends long in the up-down direction of the display panel, wherein each of the plurality of segments may include a hole into which the elastic member is inserted.

In addition, according to another aspect of the present disclosure, the display device may further include a housing which provides an inner space in which the roller is installed, and which has an opening through which the display panel and the module cover pass; and a supporter which is located in the outside of the housing, which is located in a rearward direction of the module cover, and which extends long in a direction intersecting with a length direction of the roller, wherein the supporter may have one side fixed to the module cover, has the other side coupled to the housing, and may be stretched or compressed in a length direction of the supporter.

In addition, according to another aspect of the present disclosure, the supporter may further include: a first supporter which extends long in an up-down direction, and which is movably coupled to the housing in the up-down direction; a second supporter which extends long in the up-down direction, and which is movably coupled to the first supporter in the up-down direction; and a third supporter which extends long in the up-down direction, and which is movably coupled to the second supporter in the up-down direction, wherein the module cover may further include a holder which is positioned above the plurality of segments, and to which the third supporter is fixed.

In addition, according to another aspect of the present disclosure, the module cover may further include a base coupled to the display panel and the plurality of segments between the display panel and the plurality of segments, wherein the base may include: a first part having a front surface facing a rear surface of the display panel; a second part protruding from a circumference of the first part toward the display panel; and a third part protruding from a distal end of the second part in a forward direction of the display panel, wherein the display panel may be disposed between the first part and the third part.

In addition, according to another aspect of the present disclosure, the display device may further include an adhesive member coupled to the display panel and the first part at between the display panel and the first part, wherein a boundary surface between the display panel and the adhesive member may be located on a virtual plane passing through a center of the second part.

Certain embodiments or other embodiments of the disclosure described above are not mutually exclusive or distinct from each other. Any or all elements of the embodiments of the disclosure described above may be combined or combined with each other in configuration or function.

For example, a configuration "A" described in one embodiment of the disclosure and the drawings and a configuration "B" described in another embodiment of the disclosure and the drawings may be combined with each other. Namely, although the combination between the configurations is not directly described, the combination is possible except in the case where it is described that the combination is impossible.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A display device comprising:
a flexible display panel;
a module cover positioned behind of the display panel and coupled to the display panel, the module cover having a plurality of segments which respectively extend along a left-right direction of the display panel, and which are sequentially arranged in an up-down direction of the display panel; and
a hinge shaft which is disposed between the plurality of segments, and to which the plurality of segments are rotatably coupled,
wherein the segment comprises:
 a body facing a rear side of the display panel;
 a cover covering one lateral side of the display panel;
 a guide protruding from the cover and opposite to the body with respect to the display panel; and
 a boss protruding from the guide toward the body, and
wherein the display panel is disposed between the body and the guide, and comprises a slot which extends along the one lateral side of the display panel and into which the boss is inserted.

2. The display device of claim 1,
wherein the plurality of segments comprise a first segment and a second segment that are coupled to each other by the hinge shaft,
wherein the second segment is rotatable about the hinge shaft with respect to the first segment.

3. The display device of claim 2, wherein the first segment comprises:
a first body facing the rear side of the display panel;
a first left cover covering a left side of the display panel; and
a first right cover covering a right side of the display panel,
wherein the second segment comprises:
 a second body facing the rear side of the display panel;
 a second left cover covering the left side of the display panel; and
 a second right cover covering the right side of the display panel,
wherein the second left cover is positioned above the first left cover, and covers at least a portion of a front of the first left cover.

4. The display device of claim 3,
wherein the second segment rotates in a first rotation direction while the display panel is bending, and rotates in a second rotation direction opposite to the first rotation direction while the display panel is unfolding,
wherein, when the display panel is unfolded, rotation of the second segment in the second rotation direction is restricted as the second left cover contacts the first left cover.

5. The display device of claim 3, wherein the first segment further comprises:
a first left guide which protrudes to a right from the first left cover, and which is opposite to the first body with respect to the display panel; and
a first right guide which protrudes to a left from the first right cover, and which is opposite to the first body with respect to the display panel,
wherein the display panel is disposed between the first body and the first left guide or the first right guide, and
further comprises an adhesive member positioned between the display panel and the first body, and coupled to the display panel and the first body.

6. The display device of claim 5, wherein the first segment further comprises:
a first left boss protruding from the first left guide toward to the first body; and
a first right boss protruding from the first right guide toward to the first body,
wherein the display panel further comprises:
 a left slot which is adjacent to the left side of the display panel, which extends along the left side of the display panel, and into which the first left boss inserted; and
 a right slot which is adjacent to the right side of the display panel, which extends along the right side of the display panel, and into which the second left boss inserted.

7. The display device of claim 3, wherein the first segment further comprises:
a left hole formed by penetrating the first left cover in the up-down direction of the display panel; and
a right hole formed by penetrating the first right cover in the up-down direction of the display panel,
and further comprises:
a first elastic member which has elasticity, which extends along the up-down direction of the display panel, and which is inserted into the left hole; and
a second elastic member which has elasticity, which extends along the up-down direction of the display panel, and which is inserted into the right hole.

8. A display device comprising:
a flexible display panel;
a module cover positioned behind the display panel and coupled to the display panel, the module cover having a plurality of segments which respectively extend along a left-right direction of the display panel, and which are sequentially arranged in an up-down direction of the display panel;
a hinge shaft which is disposed between the plurality of segments, and to which the plurality of segments are rotatably coupled;
a roller which extends along a length direction of the segment, and around which the display panel and the module cover are wound, or from which the display panel and the module cover are unwound;
a housing which provides an inner space in which the roller is installed, and which has an opening through which the display panel and the module cover pass;

a link which is located in a rearward direction of the module cover, which has one end pivotably connected to the housing, and which has the other end movably connected to the module cover; and a slider protruding in a rearward direction from any one of the plurality of segments, wherein the link comprises:

a first link which extends along a length direction of the roller, and which is fixed to the housing adjacent to the opening; and a second link which extends along a direction intersecting with a length direction of the first link, and which has one end pivotally coupled to a distal end of the first link, and wherein the second link comprises a link slot which is closer to the other end of the second link than to the one end, which extends along a length direction of the second link, and to which the slider is movably coupled.

9. The display device of claim 8, wherein when the display panel and the module cover are wound around the roller, the second link is folded toward the first link, as the slider slides from the other end of the second link toward the one end of the second link in the link slot, and when the display panel and the module cover are unwound from the roller, the second link is unfolded from the first link, as the slider slides from the one end of the second link toward the other end of the second link in the link slot.

10. The display device of claim 8, further comprising an idler which is rotatably coupled to an inner surface of the housing, and which is in contact with a front surface of the display panel.

11. A display device comprising:

a flexible display panel;

a module cover positioned behind the display panel and coupled to the display panel, the module cover having a plurality of segments which respectively extend along a left-right direction of the display panel, and which are spaced apart from each other in an up-down direction of the display panel;

a roller which extends along a length direction of the segment, and around which the display panel and the module cover are wound, or from which the display panel and the module cover are unwound; and an elastic member which has elasticity, and which extends along the up-down direction of the display panel, wherein each of the plurality of segments comprises a hole into which the elastic member is inserted, wherein the module cover comprises a base positioned between the display panel and the plurality of segments, and coupled to the display panel and the plurality of segments, wherein the base comprises:

a first part facing a rear side of the display panel;

a second part covering one lateral side of the display panel; and a third part protruding from the second part and opposite to the first part with respect to the display panel, wherein the display panel is disposed between the first part and the third part.

12. The display device of claim 11, further comprising:

a housing which provides an inner space in which the roller is installed, and which has an opening through which the display panel and the module cover pass; and a supporter which is located in the outside of the housing, which is located in a rearward direction of the module cover, and which extends along a direction intersecting with a length direction of the roller, wherein the supporter has one side fixed to the module cover, has the other side coupled to the housing, and is stretched or compressed in a length direction of the supporter.

13. The display device of claim 12, wherein the supporter further comprises:

a first supporter which extends along an up-down direction, and which is movably coupled to the housing in the up-down direction;

a second supporter which extends along the up-down direction, and which is movably coupled to the first supporter in the up-down direction; and a third supporter which extends along the up-down direction, and which is movably coupled to the second supporter in the up-down direction, wherein the module cover further comprises a holder which is positioned above the plurality of segments, and to which the third supporter is fixed.

14. The display device of claim 11, further comprising an adhesive member positioned between the display panel and the first part, and coupled to the display panel and the first part, wherein a boundary surface between the display panel and the adhesive member is located on a virtual plane passing through a center of the second part.

* * * * *